(12) United States Patent
Roberts et al.

(10) Patent No.: US 12,163,059 B2
(45) Date of Patent: Dec. 10, 2024

(54) POLYMER COATED SULPHUR CURED RUBBER COMPOSITION

(71) Applicant: SUBLINO LIMITED, Manchester (GB)

(72) Inventors: Philip Roberts, Altrincham (GB); Adam Donley, Ormskirk (GB); Paul Cannon, Newton-le-Willows (GB)

(73) Assignee: Sublino Limited, Manchester (GB)

( * ) Notice: Subject to any disclaimer, the term of this patent is extended or adjusted under 35 U.S.C. 154(b) by 957 days.

(21) Appl. No.: 17/058,843

(22) PCT Filed: May 29, 2019

(86) PCT No.: PCT/GB2019/051466
§ 371 (c)(1),
(2) Date: Nov. 25, 2020

(87) PCT Pub. No.: WO2019/229433
PCT Pub. Date: Dec. 5, 2019

(65) Prior Publication Data
US 2021/0206931 A1     Jul. 8, 2021

(30) Foreign Application Priority Data

May 30, 2018    (GB) .................................. 1808800.5

(51) Int. Cl.
| | | |
|---|---|---|
| *C09J 133/24* | (2006.01) | |
| *B32B 7/12* | (2006.01) | |
| *B32B 25/08* | (2006.01) | |
| *B32B 27/30* | (2006.01) | |
| *B32B 27/34* | (2006.01) | |
| *C08C 19/20* | (2006.01) | |
| *C08C 19/22* | (2006.01) | |
| *C08F 226/04* | (2006.01) | |

(52) U.S. Cl.
CPC .............. *C09J 133/24* (2013.01); *B32B 7/12* (2013.01); *B32B 25/08* (2013.01); *B32B 27/302* (2013.01); *B32B 27/34* (2013.01); *C08C 19/20* (2013.01); *C08C 19/22* (2013.01); *C08F 226/04* (2013.01)

(58) Field of Classification Search
CPC ..... C08J 7/043; C08J 3/02; C08J 5/121; C08J 7/042; C08J 5/12; C08C 19/20; C08C 19/22; C08F 226/04; C08K 3/06; C08K 5/37; C08L 9/06; C08L 2205/16; B32B 27/302; B32B 27/34; B32B 25/08; B32B 7/12; C09J 133/24
See application file for complete search history.

(56) References Cited

U.S. PATENT DOCUMENTS

| | | | |
|---|---|---|---|
| 3,297,626 A | 1/1967 | Smith | |
| 3,669,932 A * | 6/1972 | Massoubre | ............ C08G 18/67 525/445 |
| 3,686,151 A * | 8/1972 | Keim | ...................... C08F 20/54 526/923 |
| 3,697,395 A * | 10/1972 | Kehr | ...................... G03F 7/0275 522/167 |
| 4,988,753 A * | 1/1991 | Rullmann | ................ C08J 5/127 525/239 |
| 2017/0158840 A1* | 6/2017 | Cai | ...................... C09D 123/06 |

FOREIGN PATENT DOCUMENTS

| | | |
|---|---|---|
| CA | 2853243 A1 | 5/2013 |
| WO | WO-2012/017233 A1 | 2/2012 |
| WO | WO-2012/168354 A1 | 12/2012 |
| WO | WO-2017/158351 A1 | 9/2017 |
| WO | WO-2018/028365 A1 | 2/2018 |

OTHER PUBLICATIONS

International Search Report and Written Opinion in International Application No. PCT/GB2019/051466, mailed on Aug. 8, 2019.

* cited by examiner

*Primary Examiner* — John D Freeman
(74) *Attorney, Agent, or Firm* — Foley & Lardner LLP

(57) ABSTRACT

There is disclosed a method of forming a polymer coated sulphur cured rubber composition wherein the bond strength between the polymer coating and the sulphur cured rubber is surprisingly great. The method includes providing a sulphur curable rubber composition comprising a compound including at least one thiol group, and/or contacting a sulphur curable rubber composition with a compound including at least one thiol group, and contacting the sulphur curable composition with a second polymeric precursor including a diallylamide group. The compound including at least one thiol group and the second polymeric precursors are reacted together to form a polymeric layer; and the sulphur curable rubber composition is cured to form a polymer coated sulphur cured rubber composition.

17 Claims, 7 Drawing Sheets

POLYMER COATED SULPHUR CURED RUBBER COMPOSITION

CROSS-REFERENCE TO RELATED APPLICATIONS

This application is the U.S. National Stage Application under 35 U.S.C. § 371 of International Patent Application No. PCT/GB2019/051466, filed May 29, 2019, which claims the benefit of and priority to United Kingdom Patent Application No. 1808800.5, filed May 30, 2018, the entire disclosures of each of which are herein incorporated by reference for any and all purposes.

The present invention relates to a method of forming a polymer coated sulphur cured rubber composition. There is also provided a method of bonding a sulphur cured rubber to a substrate, and the resultant composite including a substrate, a sulphur cured rubber and a polymeric layer disposed therebetween.

BACKGROUND TO THE INVENTION

Textiles, such as nylon, are generally bonded to rubbers through the use of resorcinol formaldehyde latex (RFL) adhesives. RFL adhesives are used in the manufacture of tyres, diaphragms, power transmission belts, hoses and conveyor belts. In 1987, the US Environmental Protection Agency classified formaldehyde as a probable human carcinogen under conditions of unusually high or prolonged exposure. In 2013, the EU REACH Committee adopted a decision to reclassify formaldehyde as a category 1B carcinogen. There is therefore a clear need for safe alternatives to bond textiles to rubber.

Bonding to sulphur cured rubbers has traditionally proved difficult, without the use of resorcinol formaldehyde latexes and/or isocyanates.

Known adhesives, paints, inks and coatings generally contain a significant amount of organic solvents. The use of such organic solvents facilitates the application of known coatings to substrates, increases the speed of drying following application, and facilitates the formation of an even, regular coating. Following addition, organic solvents evaporate releasing volatile organic compounds (VOCs) into the atmosphere. Such release is hazardous for human health, being associated with respiratory conditions, cancer (in particular lung cancer), liver disease, skin and eye irritation, headaches, nausea and muscle weakness.

Tie resins are adhesive polymers used to bond layers together in coextrusion or extrusion lamination. Tie adhesives are solvent, aqueous or two part cured liquids that bond substrates together in adhesive lamination. Commonly such adhesives include isocyanate.

It is an object of the present invention to provide a method of forming a polymer coated sulphur cured rubber composition. In particular, the method does not include the use of hazardous chemicals such as formaldehyde, and additionally does not generally involve the use of isocyanate which is also associated with health risks.

The present invention seeks to provide a method of bonding sulphur cured rubber to a substrate, in particular a textile or a low surface energy substrate. Generally, the resultant bond has surprisingly high bond strength.

STATEMENT OF INVENTION

According to a first aspect of the present invention there is provided a method of forming a polymer coated sulphur cured rubber composition including:

providing a sulphur curable rubber composition comprising a compound including at least one thiol group, and/or contacting a sulphur curable rubber composition with a compound including at least one thiol group, and contacting the sulphur curable composition with a second polymeric precursor including a compound of formula A or II as defined herein (generally a compound of formula I or II);

reacting the compound including at least one thiol group and the second polymeric precursor to form a polymeric layer; and curing the sulphur curable rubber composition to form a polymer coated sulphur cured rubber composition.

The thiol group(s) are free to react during the method disclosed herein, in particular during curing of the sulphur curable rubber composition, and during polymerisation of the second polymeric precursors.

Generally, any thiol groups included in the second polymeric precursor (Formula A, I or II) would react with groups within the second polymeric precursor and would therefore not be available for reaction during curing of the sulphur curable rubber composition and during polymerisation of the second polymeric precursor. Thiol groups included in the second polymeric precursor would therefore not be available for reaction with the rubber and would thus not promote adhesion to the cured rubber.

The diallylamide groups of the second polymeric precursor tend to require more stringent conditions to allow curing. In particular, a higher cure temperature is generally required for the diallylamide groups of the second polymeric precursor than for the thiol groups to bond to the sulphur curable rubber composition.

According to one embodiment, the ratio of diallylamide groups of the second polymeric precursor to thiol groups which react to form the polymeric layer is 1:1.5 to 25; typically 1:5 to 20; generally 1:7 to 15.

According to one embodiment, the ratio of diallylamide groups of the second polymeric precursor to thiol groups which react to form the polymeric layer is from 0.5:5 to 5:0.5, generally 1:2 to 2:1.

According to a further aspect of the present invention, there is provided a method of bonding a sulphur cured rubber to a substrate comprising:

providing a sulphur curable rubber composition;

providing a substrate;

disposing a compound including at least one thiol group between the sulphur curable rubber composition and the substrate and/or within the sulphur curable rubber composition;

disposing a second polymeric precursor including a compound of formula A, I or II as defined herein between the sulphur curable rubber composition and the substrate;

reacting the compound including at least one thiol group and the second polymeric precursors to form a polymeric layer;

curing the sulphur curable rubber composition.

The compound including at least one thiol group and the second polymeric precursor may react synergistically to form a very high strength bond between the sulphur cured rubber and the substrate. Typically the strength of the bond is at least 100% greater (when measured in N/m) than that of the additive bond strength of a bond formed from either a first polymer or a second polymer where the first polymer is formed from only one of the compounds including at least one thiol group and the second polymeric precursor and the second polymer is formed from the other of the compound including at least one thiol group and the second polymeric precursor.

Generally the strength of the bond is at least 200% greater than the bond strength associated with a polymer formed from (when measured in N/m) that of the additive bond strength of a bond formed from either the first polymer or the second polymer, suitably at least 400% greater, more suitably at least 500% greater.

Synergism is particularly evident where the ratio of diallylamide groups to thiol groups is less than one, that is thiol groups are in excess. In particular, synergism is evident where the ratio is 1:1.5 to 25 typically 1:5 to 20, generally 1:7 to 15.

According to a further aspect of the present invention, there is provided a composite including a substrate, a sulphur cured rubber and a polymeric layer disposed therebetween, wherein the polymeric layer is formed through the reaction between the thiol groups and the second polymeric precursor including a compound of formula A or II as defined herein.

According to a further aspect of the present invention, there is provided a kit including a substrate, a sulphur curable rubber composition, a composition comprising a compound including at least one thiol group and a composition comprising a second polymeric precursor including a compound of formula A or II as defined herein.

According to a further aspect of the present invention, there is provided an emulsion including an oil phase comprising either a compound including at least one thiol group or a second polymeric precursor including a compound of formula A, or II as defined herein and an aqueous phase comprising the other of a compound including at least one thiol group or a second polymeric precursor including a compound of formula A, or II as defined herein. Preferably, the oil phase comprises the compound including at least one thiol group and the aqueous phase includes a second polymeric precursor including a compound of formula A, or II as defined herein.

Preferably, the emulsion does not include any cross-linking between the thiol groups and the second polymeric precursor. Co-polymerisation does not generally occur between the compound including at least one thiol group and the second polymeric precursor until after water has been substantially removed from the emulsion resulting in the thiol groups and the second polymeric precursors being in close proximity. Generally co-polymerisation does not incur until the emulsion has been heated, for instance at temperatures of around 100 to 300° C. Water is generally removed from the emulsion through evaporation through heating of the emulsion. Accordingly, co-polymerisation does not generally take place until after water has been substantially removed therefrom and the composition ceases to be an emulsion.

Throughout the Application, where apparatus, products or kits are described as having, including, or comprising specific components, or where methods are described as having, including, or comprising specific method steps, it is contemplated that apparatus, products or kits of the present teachings also consist essentially of, or consist of, the recited components, and that the methods of the present teachings also consist essentially of, or consist of, the recited process steps.

In the Application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the singular herein includes the plural (and vice versa) unless specifically stated otherwise. In particular, where the indefinite article is used, the specification is to be understood as contemplating plurality as well as singularity, unless the context requires otherwise.

In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps. All documents referred to herein are incorporated by reference.

Definitions

Ambient temperature denotes the range 20 to 26° C., with an average temperature of 23 to 25° C., generally around 23° C.

All numerical values provided incorporate 10% less than and 10% more than the numerical value provided.

Hydrocarbyl

The term "hydrocarbyl" as used herein includes reference to moieties consisting exclusively of hydrogen and carbon atoms; such a moiety may comprise an aliphatic and/or an aromatic moiety. The moiety may comprise 1, 2, 3, 4, 5, 6, 7, 8, 9, 10, 11, 12, 13, 14, 15, 16, 17, 18, 19 or 20 carbon atoms. Examples of hydrocarbyl groups include $C_{1-6}$ alkyl (e.g. $C_1$, $C_2$, $C_3$ or $C_4$ alkyl, for example methyl, ethyl, propyl, isopropyl, n-butyl, sec-butyl or tert-butyl); $C_{1-6}$ alkyl substituted by aryl (e.g. benzyl) or by cycloalkyl (e.g. cyclopropylmethyl); cycloalkyl (e.g. cyclopropyl, cyclobutyl, cyclopentyl or cyclohexyl); alkenyl (e.g. 2-butenyl); alkynyl (e.g. 2-butynyl); aryl (e.g. phenyl, benzyl, naphthyl or fluorenyl) and the like. A hydrocarbyl may be saturated or unsaturated and may include alkyl, alkenyl, alkynyl, haloalkyl, carbocyclyl, for example heterocyclyl, aryl and heteroaryl groups. A hydrocarbyl group or portion may be straight chain or branched and may be substituted or unsubstituted.

Alkyl

The terms "alkyl" and "$C_{1-6}$ alkyl" as used herein can be used interchangeably and include reference to a straight or branched chain alkyl moiety having 1, 2, 3, 4, 5 or 6 carbon atoms. This term includes reference to groups such as methyl, ethyl, propyl (n-propyl or isopropyl), butyl (n-butyl, iso-butyl, sec-butyl or tert-butyl), pentyl, hexyl and the like. In particular, alkyl may have 1, 2, 3 or 4 carbon atoms. Haloalkyl relates to an alkyl radical preferably having 1 to 8 carbon atoms, preferably 1 to 4 carbon atoms, substituted with one or more halide atoms for example $CH_2CH_2Br$, $CF_3$ or $CCl_3$. The term "small alkyl group" refers to an alkyl group having a carbon backbone of 1 to 6 carbon atoms, typically 1 to 4 carbon atoms.

Alkenyl

The terms "alkenyl" and "$C_{2-6}$ alkenyl" as used herein can be used interchangeably and include reference to a straight or branched chain alkyl moiety having 2, 3, 4, 5 or 6 carbon atoms and having, in addition, at least one double bond, of either E or Z stereochemistry where applicable. This term. includes reference to groups such as ethenyl, 2-propenyl, I-butenyl, 2-butenyl, 3-butenyl, 1-pentenyl, 2-pentenyl, 3-pentenyl, 1-hexenyl, 2-hexenyl and 3-hexenyl and the like.

Alkynyl

The terms "alkynyl" and "$C_{2-6}$ alkynyl" as used herein can be used interchangeably and include reference to a straight or branched chain alkyl moiety having 2, 3, 4, 5 or 6 carbon atoms and having, in addition, at least one triple bond. This term includes reference to groups such as ethynyl, 1-propynyl, 2-propynyl, 1-butynyl, 2-butynyl, 3-butynyl, 1-pentynyl, 2-pentynyl, 3-pentynyl, 1-hexynyl, 2-hexynyl and 3-hexynyl and the like.

Alkoxy

The terms "alkoxy" and "$C_{1-6}$ alkoxy" as used herein can be used interchangeably and include reference to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

Cycloalkyl

The term "cycloalkyl" as used herein includes reference to an alicyclic moiety having 3, 4, 5, 6, 7 or 8 carbon atoms. The group may be a bridged or polycyclic ring system. More often cycloalkyl groups are monocyclic. This term includes reference to groups such as cyclopropyl, cyclobutyl, cyclopentyl, cyclohexyl, norbornyl, bicyclo[2.2.2]octyl and the like.

Aryl

The term "aryl" as used herein includes reference to an aromatic ring system comprising 6, 7, 8, 9, 10, 11, 12, 13, 14, 15 or 16 ring carbon atoms. Aryl is often phenyl but may be a polycyclic ring system, having two or more rings, at least one of which is aromatic. This term includes reference to groups such as phenyl, naphthyl, fluorenyl, azulenyl, indenyl, anthryl and the like.

Carbocyclyl

The term "carbocyclyl" as used herein includes reference to a saturated (e.g. cycloalkyl) or unsaturated (e.g. aryl) ring moiety having 3, 4, 5, 6, 7, 8, 9, 10, 11, 12, 13, 14, 15 or 16 carbon ring atoms. In particular, carbocyclyl includes a 3- to 10-membered ring or ring system and, in particular, a 5- or 6-membered ring, which may be saturated or unsaturated. A carbocyclic moiety is, for example, selected from cyclopropyl, cyclobutyl, cyclopentyl, cyclohexyl, norbomyl, bicyclo [2.2.2]octyl, phenyl, benzyl, naphthyl, fluorenyl, azulenyl, indenyl, anthryl and the like.

Heterocyclyl

The term "heterocyclyl" as used herein includes reference to a saturated (e.g. heterocycloalkyl) or unsaturated (e.g. heteroaryl) heterocyclic ring moiety having from 3, 4, 5, 6, 7, 8, 9, 10, 11, 12, 13, 14, 15 or 16 ring atoms, at least one of which is selected from nitrogen, oxygen, phosphorus, silicon and sulphur. In particular, heterocyclyl includes a 3- to 10-membered ring or ring system and more particularly a 5- or 6- or 7-membered ring, which may be saturated or unsaturated.

A heterocyclic moiety is, for example, selected from oxiranyl, azirinyl, 1,2-oxathiolanyl, imidazolyl, thienyl, furyl, tetrahydrofuryl, pyranyl, thiopyranyl, thianthrenyl, isobenzofuranyl, benzofuranyl, chromenyl, 2H-pyrrolyl, pyrrolyl, pyrrolinyl, pyrrolidinyl, imidazolyl, imidazolidinyl, benzimidazolyl, pyrazolyl, pyrazinyl, pyrazolidinyl, thiazolyl, isothiazolyl, dithiazolyl, oxazolyl, isoxazolyl, pyridyl, pyrazinyl, pyrimidinyl, piperidyl, piperazinyl, pyridazinyl, morpholinyl, thiomorpholinyl, especially thiomorpholino, indolizinyl, isoindolyl, 3H-indolyl, indolyl, benzimidazolyl, cumaryl, indazolyl, triazolyl, tetrazolyl, purinyl, 4H-quinolizinyl, isoquinolyl, quinolyl, tetrahydroquinolyl, tetrahydroisoquinolyl, decahydroquinolyl, octahydroisoquinolyl, benzofuranyl, dibenzofuranyl, benzothiophenyl, dibenzothiophenyl, phthalazinyl, naphthyridinyl, quinoxalyl, quinazolinyl, quinazolinyl, cinnolinyl, pteridinyl, carbazolyl, β-carbolinyl, phenanthridinyl, acridinyl, perimidinyl, phenanthrolinyl, furazanyl, phenazinyl, phenothiazinyl, phenoxazinyl, chromenyl, isochromanyl, chromanyl and the like.

Halogen

The term "halogen" as used herein includes reference to F, Cl, Br or I. In particular, halogen may be F or Cl.

Substituted

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible. For example, amino or hydroxy groups with free hydrogen may be unstable if bound to carbon atoms with unsaturated (e.g. olefinic) bonds. Additionally, it will of course be understood that the substituents described herein may themselves be substituted by any substituent, subject to the aforementioned restriction to appropriate substitutions as recognised by the skilled man.

Independently

Where two or more moieties are described as being "each independently" selected from a list of atoms or groups, this means that the moieties may be the same or different. The identity of each moiety is therefore independent of the identities of the one or more other moieties.

Method of Bonding

According to a first aspect of the present invention there is provided a method of forming a polymer coated sulphur cured rubber composition including:

providing a sulphur curable rubber composition comprising a compound including at least one thiol group, and/or contacting a sulphur curable rubber composition with a compound including at least one thiol group, and
contacting the sulphur curable rubber composition with a second polymeric precursor including a compound of formula A or II as defined herein;

reacting the compound including at least one thiol group and the second polymeric precursors to form a polymeric layer; and curing the sulphur curable rubber composition to form a polymer coated sulphur cured rubber composition.

According to a further aspect of the present invention, there is provided a method of bonding a sulphur cured rubber to a substrate comprising:

providing a sulphur curable rubber composition;
providing a substrate;
disposing a compound including at least one thiol group between the sulphur curable rubber composition and the substrate and/or within the sulphur curable rubber composition;
disposing a second polymeric precursor including a compound of formula A or II (generally formula I or II) as defined herein between the sulphur curable rubber composition and the substrate;
reacting the compound including at least one thiol group with the second polymeric precursor to form a polymeric layer;
curing the sulphur curable rubber composition.

The methods of the present invention avoid the use of carcinogenic formaldehyde, used to prepare resorcinol formaldehyde latex and avoid the use of isocyanates. The risks to health associated with current methods of bonding to sulphur cured rubber are thus greatly reduced.

The strength of the bond formed through the reaction of the compound including at least one thiol group and the second polymeric precursor is surprisingly high, generally at least 5000 N/m; typically, at least 10,000 N/m. In contrast, without the addition of the thiol containing compound, the compounds of formula A or II generally produce a polymeric coating having an associated bond strength of less than 2000 N/m, and in many instances significantly less than this.

The compound including at least one thiol group and the second polymeric precursor react synergistically to form polymeric bonds with surprisingly high associated bond strength.

This synergism results in polymeric bonds with associated bond strength generally at least 100% greater than the bond strength associated with a polymer formed from only one of the compound including at least one thiol group or the second polymeric precursor, generally, at least 500% greater; suitably at least 1000% greater; typically, at least 2000% greater.

According to one embodiment, the ratio of diallylamide groups of the second polymeric precursor to thiol groups which react to form the polymeric layer is less than one, suitably from around 1:2 to 30; typically 1:1.5 to 25 typically 1:5 to 20, generally 1:7 to 15.

The ratio of diallylamide groups of the second polymeric precursor to thiol groups which react to form the polymeric layer may be less than 1, that is the thiol groups are generally in excess relative to the diallylamide groups.

Typically the ratio of diallylamide groups:thiol groups is 1:5 to 30; generally 1:7 to 20, suitably 1:10 to 17. According to one embodiment, the ratio of diallylamide groups to thiol groups is around 1:15. According to a further embodiment the ratio of diallylamide groups to thiol groups is around 1:7 to 8.

As noted above, the thiol-containing compound may be provided within the sulphur curable rubber composition and may thus be added to the rubber composition in excess of the ratios provided above on the understanding that not all of the thiol groups will react with diallylamide groups of the second polymeric precursor.

Alternatively, the sulphur curable rubber composition may be contacted with the compound including at least one thiol group.

According to one embodiment, the sulphur curable rubber composition comprises the compound including at least one thiol group and the sulphur curable rubber composition is contacted with the compound including at least one thiol group.

Where it is provided above that the sulphur curable rubber composition is contacted with one of the thiol-containing compound and the second polymeric precursor, this also includes reference to the sulphur curable rubber composition being coated with one of the thiol-containing compound and the second polymeric precursor and being contacted with the other of the thiol-containing compound and the second polymeric precursor. For example, where the sulphur curable rubber composition is contacted with the thiol-containing compound prior to contact with the second polymeric precursor, the second polymeric precursor may be applied to the coated sulphur curable rubber composition and may not directly contact the sulphur curable rubber composition. According to one embodiment, the coated sulphur curable rubber composition may be contacted with the thiol-containing compound or with the second polymeric precursor.

The compound including at least one thiol group is generally in contact with the second polymeric precursor prior to and/or during polymerisation of the second polymeric precursor, allowing reaction therebetween allowing the formation of a polymeric layer.

The conditions necessary to cure the rubber composition are generally sufficient to initiate reaction between the compound including at least one thiol group and the second polymeric precursor to form a polymeric layer. As the rubber composition is generally cured while the compound including at least one thiol group and the second polymeric precursor are reacting, covalent bonds may be formed between the resultant polymeric layer and the rubber composition.

The application of elevated temperature and/or elevated pressure to the rubber composition or the rubber composition/substrate combination may be sufficient to cure the rubber and to initiate the reaction between the compound including at least one thiol group and the second polymeric precursors in a single step.

According to one embodiment, elevated temperature and/or elevated pressure is applied to a surface of the sulphur curable rubber composition distal from the compound including at least one thiol group and/or the second polymeric precursor.

According to one embodiment, elevated temperature and/or elevated pressure is applied to a surface of the sulphur curable rubber composition facing away from the substrate, and/or elevated temperature and/or elevated pressure is applied to a surface of the substrate facing away from the sulphur curable rubber composition.

According to one embodiment, typically temperatures of 100 to 300° C. are usual to cure the rubber composition, suitably 100 to 250° C., typically 120° C. to 230° C., generally around 120° C. to around 170° C., alternatively around 200 to 250° C. Increased pressure is generally also applied to cure the rubber composition in order to achieve good contact.

According to one embodiment, the substrate is contacted with the second polymeric precursor, and the coated substrate is then disposed proximate to the sulphur curable rubber composition. The second polymeric layer may be cured on the substrate prior to the coated substrate being disposed proximate to the sulphur curable rubber composition.

Suitably, the sulphur curable rubber composition comprises the compound including at least one thiol group. In particular, the sulphur curable rubber composition and the compound including at least one thiol group may be in solution together. Suitable solvents include water, and organic solvents.

Alternatively, or additionally, the compound including at least one thiol group may be disposed on a surface of the sulphur curable rubber composition. Suitably the compound including at least one thiol group may be included in a sulphur curable rubber composition, for instance in the form of a latex, a tie resin or a tie composition. Generally, the tie resin/composition includes a solvent such as toluene, xylene, methyl ethyl ketone (MEK) and acetone.

Typically, the composition including the thiol-containing compound does not include isocyanate. The composition including the thiol-containing compound may be in the form of a solution, a resin or an emulsion, suitably an emulsion.

According to one embodiment, the composition including the thiol-containing compound is in the form of a first emulsion, and the composition including the second polymeric precursor is in the form of a second emulsion.

According to one embodiment, the substrate is contacted with the compound including at least one thiol group and/or the second polymeric precursor, and the coated substrate is then disposed proximate to the sulphur curable rubber composition. According to one embodiment, the compound including at least one thiol group may be cured prior to the coated substrate being disposed proximate to the sulphur curable composition.

Suitably, the substrate is contacted with the second polymeric precursor and the coated substrate is then contacted with the compound including at least one thiol compound (or vice versa) prior to the coated substrate being disposed proximate to the sulphur curable rubber composition.

According to one embodiment, the compound including at least one thiol group and/or the second polymeric precursor may be coated on the substrate prior to the coated substrate being disposed proximate to the sulphur curable rubber composition. Suitably, one of the compound including at least one thiol group and/or the second polymeric precursor may be cured on the substrate prior to the coated substrate being disposed proximate to the sulphur curable rubber composition The conditions necessary to cure the sulphur curable rubber composition are generally sufficient to instigate the reaction between the compound including at least one thiol group and the second polymeric precursor, such conditions generally include elevated temperatures, for example temperatures of around 50 to 300° C., generally 100 to 250° C., suitably around 100-220° C.; optionally also in the presence of elevated pressure.

The conditions necessary to polymerise the compound including at least one thiol group and the second polymeric precursor depend on the identity of the compounds used. Where the second polymeric precursors include a compound of formulae I or II, temperatures necessary to instigate polymerisation are likely to be less than 300° C., generally 160 to 260° C., suitably 220 to 240° C.

Where the second polymeric precursor includes a compound of formula A where $R^6$ does not represent a quaternary ammonium cation, the conditions needed to instigate polymerisation may suitably be less than 300° C., generally 160 to 260° C., suitably 220 to 240° C., alternatively around 140 to 200° C.

Generally, the amount of the polymeric precursor added to each $m^2$ area of the sulphur curable rubber composition and/or of the substrate is less than 5% of the dry weight of the substrate for each of the polymeric precursor compositions and more specifically less than 2% of the dry weight of the substrate (suitably a textile). Accordingly the additive increase in weight would be 10 wt. % or less. However, some of the high end, harder to bond to textiles require more coating.

Sulphur Cured Rubber Composition

The methods of the present invention may be used to prepare a polymer coated sulphur cured rubber composition. The methods are suitable in connection with any sulphur cured/sulphur vulcanised/sulphur curable rubber composition. The rubber may be natural or synthetic.

The sulphur cured rubber compositions of the present invention generally include around 0.5 to 10% sulphur. Also included are sulphur curable rubbers where the sulphur is derived from sulphur donor chemicals.

Curing of the rubber compositions typically takes place at temperatures of around 120-170° C.

Reference may be made to acrylonitrile butadiene rubber (nitrile/NBR rubber), styrene butadiene rubber (SBR rubber), neoprene rubber, silicone rubber, fluorosilicone rubber, fluorocarbon rubber, perfluorocarbon rubber, ethylene propylene diene monomer rubber (EPDM rubber), butyl rubber (isobutylene-isoprene)TFE/P rubber.

The sulphur curable rubber composition may include the thiol-containing compound. According to such embodiments, the sulphur curable rubber composition generally includes 20 wt. % or less, typically 15 wt. % or less, suitably 10 wt. % or less of the compound including at least one thiol group Compound including at least one Thiol Group The compound including at least one thiol group and the second polymeric precursor are provided as separate compounds. Generally, the compound including at least one thiol group and the second polymeric precursor are provided in separate compositions.

The thiol group(s) are available for reaction with the rubber composition and/or with the second polymeric precursor.

According to one embodiment, the first and second precursors are provided within one composition. The composition may be an aqueous composition. The polymeric precursors tend to copolymerise only after heating of the aqueous composition to evaporate water, allowing the precursors to be in closer proximity to each other, and to initiate curing.

Such a composition provides increased ease of use and storage compared to two separate compositions. However, there is an increased risk of the thiol groups reacting with groups contained within such a composition. Additionally, or alternatively the thiol groups and the diallylamide groups may require different conditions to cure. Specifically, the diallylamide groups may require a higher temperature to initiate polymerisation.

Generally, the compound including at least one thiol group comprises an optionally substituted hydrocarbyl group and one to eight thiol groups, generally 1, 2, 3 or 4 thiol groups.

Suitably the compound including at least one thiol group does not include any functional groups except for thiol which react under the conditions used to instigate reaction with the second polymeric precursor to form a polymeric layer.

According to one embodiment, the compound including at least one thiol group may comprise a functional group other than thiol capable of reacting under the polymerisation conditions of the method. Suitable groups include silane, alkenyl silenol, alkoxy silane (in particular, Si—OMe or Si-OEt), azine and/or chloro silane.

The compound including at least one thiol group generally comprises an optionally substituted hydrocarbyl group and one or more thiol groups. The hydrocarbyl group may be saturated or unsaturated and may include alkyl, alkenyl, alkynyl, carbocyclyl, for example heterocyclyl, aryl and heteroaryl groups. A hydrocarbyl group or portion may be straight chain or branched and may be substituted or unsubstituted.

Generally, the compound including at least one thiol group comprises a carbocyclyl, in particular a heterocyclyl, portion.

According to one embodiment, the optionally substituted hydrocarbyl group has a carbon backbone of 2 to 30 carbon atoms, generally 3 to 20 carbon atoms, suitably 5 to 10 carbon atoms.

The hydrocarbyl group may be substituted with one or more of the groups selected from small hydrocarbyl group, typically small alkyl group cycloalkyl group, $C_{1\ to\ 6}$ alkoxy, silyl, oxo (i.e. hydroxyl), nitro (i.e. amino); typically, silyl, oxo and/or nitro.

The compound including at least one thiol group typically comprises a hydrocarbyl group substituted with one or more ether, ketone, ester, silane, amide, azine and/or amine groups; suitably one or more ester, ether and/or amide groups.

According to one embodiment, the compound including at least one thiol group includes a hydrocarbyl group substituted with one or more ester groups; typically, one or more ester groups and one or more ether groups; suitably one or more ester groups and one or more amide groups.

According to one embodiment, the compound including at least one thiol group includes a hydrocarbyl group substituted with one or more ether groups.

According to one embodiment, the compound including at least one thiol group includes a hydrocarbyl group substituted with one or more azine groups, typically one to four azine groups.

Suitably the compound including at least one thiol group may include a hydrocarbyl group substituted with one or more amide groups, typically one to four, such as two or three amide groups. The amide group may be a cyclic amide.

Typical examples of suitable compounds for use as the compound including at least one thiol group include the following: Pentaerythritol tetra (3-mercaptopropionate) (PETMP); 2, 2'-(ethylenedioxy)diethanethiol (EDDT); 2,4, 6-Trimercaptotriazine; Tris[2-(3-mercaptopropionyloxy) ethyl]isocyanurate (TMPEIC) having the structure below:

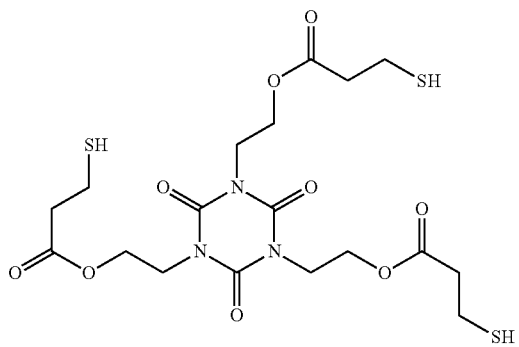 [SMILES: O=C(CCS)OCCn1c(=O)n(CCOC(=O)CCS)c(=O)n(CCOC(=O)CCS)c1=O]

According to one embodiment, the compound including at least one thiol group is a mercapto silane, such as 3-Mercaptopropyltrimethoxysilane $(CH_3O)_3SiC_3H_6SH$.

Generally, the compound including at least one thiol group has a low solubility in water at ambient temperature and pressure; typically, a water solubility of less than around 0.5 wt. %, suitably a water solubility of less than around 0.3 wt. %, generally a water solubility of less than around 0.1% by weight at ambient temperature and pressure.

Second Polymeric Precursor including a Compound of Formula A or Formula II

The second polymeric precursor may include a compound of Formula A:

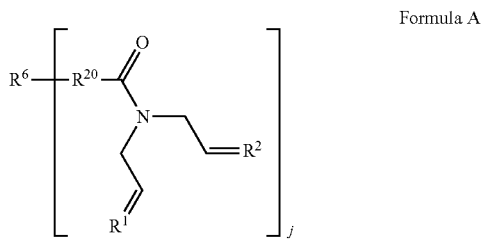

Formula A wherein:
$R^6$ represents an amine moiety (including a quaternary ammonium cation) or a hydrocarbyl group, optionally substituted or interposed with functional groups such as one or more of an amine moiety, C(O) or COOH.

$R^{20}$ represents an optionally substituted hydrocarbyl group, generally a $C_{1-6}$ alkyl group such as a methyl, ethyl or propyl group, suitably a methyl or ethyl group.

Each of $R^1$ and $R^2$ independently represents an optionally substituted hydrocarbyl group, generally $C_{1-6}$ alkyl, typically a methyl, ethyl or propyl group, suitably a methyl group.

J is an integer from 1 to 4 (generally 1, 2 or 3).

$R^6$ may represent a saturated or unsaturated hydrocarbyl group, including an alkyl, alkenyl, alkynyl, carbocyclyl group, for example heterocyclyl, aryl and heteroaryl group.

According to one embodiment, $R^6$ represents an aryl group such as a benzene group. In such embodiments, j is generally an integer 2 or 3, where the diallyl amine groups may be arranged symmetrically or unsymmetrically around the $R^6$ aryl group.

According to an alternative embodiment, $R^6$ represents a quaternary ammonium cation. Generally, the compounds of Formula A have the structure of formula I. Compounds of Formulae I and II may be as described in WO2017/158351, incorporated herein by reference.

The compounds of formula I have the following structure

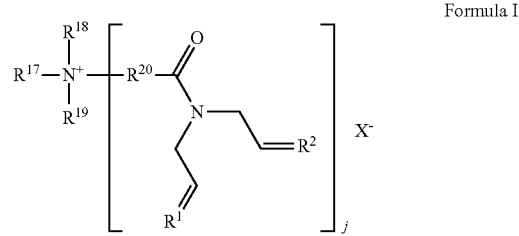

Formula I

Wherein
R²⁰ represents an optionally substituted hydrocarbyl group, generally a $C_{1-6}$ alkyl group such as a methyl, ethyl or propyl group, suitably a methyl or ethyl group each of $R^{17}$ to $R^{19}$ may be absent, or independently represents an optionally substituted hydrocarbyl group, or hydrogen; generally, an aliphatic hydrocarbon group (e.g. $C_{1-6}$ alkyl, alkenyl, alkynyl), in particular an optionally substituted alkyl group, typically $C_{1-6}$ alkyl;

Each of $R^1$ and $R^2$ independently represents an optionally substituted hydrocarbyl group, generally $C_{1-6}$alkyl, typically a methyl, ethyl or propyl group, suitably a methyl group;

J is an integer from 1 to 4.

X⁻ represents a counter ion.

Suitably in the compound of Formula I, J represents the integer 1 or 2, more suitably 2. Typically, J represents 2, $R^{20}$ represents methyl, one of $R^{17}$ to $R^{19}$ is absent, one of $R^{17}$ to $R^{19}$ represents hydrogen, and one of $R^{17}$ to $R^{19}$ represents an optionally substituted $R_{1-6}$ alkyl group. Generally, one of $R^{17}$ to $R^{19}$ represents an unsubstituted $R_{1-6}$ alkyl group, typically an unsubstituted $R_{3-6}$ alkyl group. Alternatively, one of $R^{17}$ to $R^{19}$ represents a substituted $R_{1-6}$ alkyl group, typically substituted with an alkoxy silyl group. Suitably, one of $R^{17}$ to $R^{19}$ represents a substituted $R_{24}$ alkyl group, typically substituted with an ethoxy silyl group.

Alternatively, the second polymeric precursor may have the structure of formula II having the following structure:

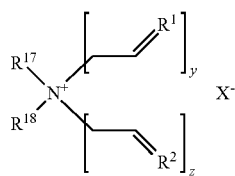

Wherein
each of $R^{17}$ and $R^{18}$ may be absent, or independently represents an optionally substituted hydrocarbyl group, or hydrogen; generally, an aliphatic hydrocarbon group (e.g. $C_{1-6}$ alkyl, alkenyl, alkynyl), in particular an optionally substituted alkyl group, typically $C_{1-6}$ alkyl;

Each of $R^1$ and $R^2$ independently represents an optionally substituted hydrocarbyl group, generally $C_{1-6}$ alkyl, typically a methyl, ethyl or propyl group, suitably a methyl group;

Y is an integer of from 1 to 3, generally 1;

Z is an integer of from 1 to 3, generally 1;

wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent;

X⁻ represents a counter ion.

According to one embodiment, Y represents 1, Z represents 1; one of $R^{17}$ and $R^{18}$ represents an optionally substituted $C_{10}$ to $C_{30}$alkyl group and one of $R^{17}$ and $R^{18}$ represents methyl, ethyl or hydrogen.

One or more of $R^1$, $R^2$ and/or $R^{17}$ to $R^{20}$ may independently represent a hydrocarbyl group independently substituted with one or more of the groups selected from small hydrocarbyl group, typically small alkyl group cycloalkyl group, $C_1$ to $C_6$ alkoxy, silyl, halogen, oxo (i.e. hydroxyl), thio, nitro (i.e. amino), trifluoromethyl and/or cyano; typically, silyl, oxo and/or nitro. Particular mention may be made of the groups hydroxyl, —Si(OR¹³)₃, —NR¹³₂, —OR¹³, —SR¹³, —C(O)R¹³, —C(O)OR¹³, —OC(O)R¹³, —NR¹³COR¹³, NR¹³CONR¹³₂, —NR¹³COR¹³, NR¹³, —C(O)R¹³, —S(O)R¹³, —S(O)₂R¹³, —SONR¹³₂, NR¹³S(O)₂R¹³, —CSR¹³, —N(R¹³)R¹³, —C(O)N(R¹³)R¹³, —SO₂N(R¹³)R¹³, and R¹³.

Each R¹³ group may be independently selected from hydrogen, hydroxyl, hydrocarbyl (e.g. $C_{1-6}$ alkyl, alkenyl, alkynyl, or haloalkyl), carbocyclyl and —(CH₂)ₘ-heterocyclyl, and each R¹³ may optionally and independently be substituted with one or more halogen, cyano, amino, hydroxyl, $C_{1-6}$ alkyl or cycloalkyl and $C_{1-6}$ alkoxy; M is an integer from 1 to 6.

According to one embodiment, one or more of $R^1$, $R^2$ and/or $R^{17}$ to $R^{20}$ may represent a hydrocarbyl group, suitably an alkyl group, substituted with one or more of the groups selected from small alkyl group, —Si(O—$C_{1\ to\ 6}$ alkyl)₃ (generally —Si(OCH₃)₃ or —Si(OC₂H₅)₃), —COOH, NH₂ and OH.

According to one embodiment one or more of $R^1$, $R^2$, and/or $R^{17}$ to $R^{20}$ may represent an unsubstituted hydrocarbyl group, in particular an unsubstituted alkyl group.

According to one embodiment at least one of $R^{17}$ to $R^{19}$ represents an optionally substituted alkyl group, generally an optionally substituted $C_{1-6}$ alkyl group; typically at least one of $R^{17}$ to $R^{19}$ represents a substituted alkyl group.

Preferred substituents for the $R^{17}$ to $R^{19}$ hydrocarbyl group include amino, hydroxyl, silyl, including a silyl group substituted with one or more alkoxy groups such as a methoxy, ethoxy and propoxy groups.

Generally, at least one of $R^{17}$ to $R^{19}$ represents an unsubstituted $C_{1\ to\ 6}$ alkyl group, or a $C_{1\ to\ 6}$ alkyl group substituted with one of the following groups: Si(OCH₃)₃, Si(OC₂H₅)₃), COOH, NH₂ and OH.

Alternatively, at least one of $R^{17}$ to $R^{19}$ may represent an optionally substituted long chain alkyl group (e.g. $C_{10}$ to $C_{30}$); generally, one of $R^{17}$ to $R^{19}$ represents a $C_{10}$ to $C_{30}$ alkyl group, generally a $C_{15}$ to $C_{25}$ alkyl group.

Generally, at least one of $R^{17}$ to $R^{19}$ represents hydrogen or methyl, typically one of $R^7$ to $R^{19}$ represents hydrogen or methyl, more typically hydrogen.

According to one embodiment, two of the $R^{17}$ to $R^{19}$ groups of formula (I) or (II) may together form a cyclic group.

Generally, $R^1$, $R^2$ and $R^{20}$ represent an unsubstituted small alkyl group, in particular a $C_{1-4}$ alkyl group, typically methyl or ethyl. Typically, $R^1$ and $R^2$ represent methyl. Suitably $R^{20}$ represents methyl or ethyl.

According to one embodiment, the second polymeric precursor is of Formula I and each of $R^{17}$ to $R^{19}$ independently represents an optionally substituted $C_{1-6}$ alkyl group, or hydrogen;

$R^{20}$ represents a methyl or ethyl group;

and J represents the integer 1 or 2, wherein if J represents 2, one of $R^{17}$ to $R^{19}$ is absent.

According to one embodiment, the compound of Formula I has the structure as selected from the following group (where the associated counter ions are not shown):

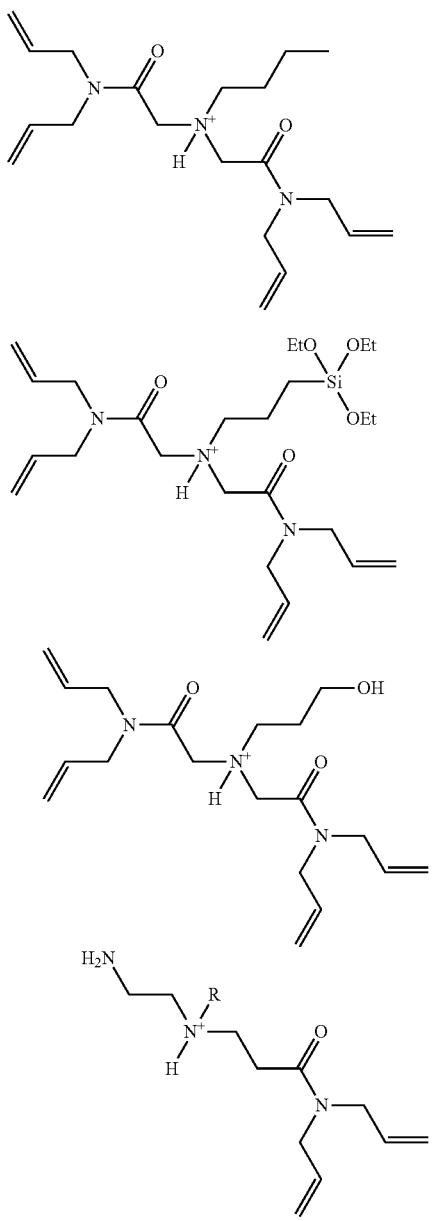

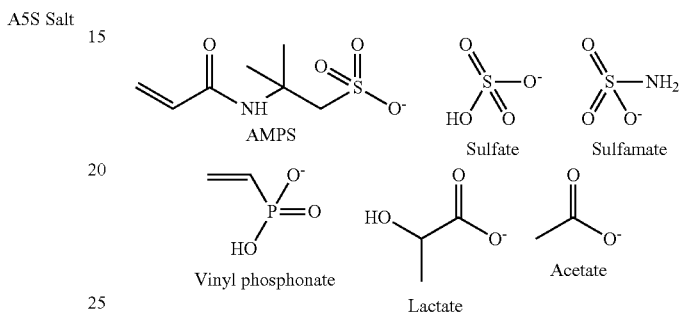

Where R represents a substituted or unsubstituted alkyl group, in particular straight chain alkyl group.

According to one embodiment, the compounds of Formula A may bebenzene-tricarboxylic acid -tris-N,N-Diallylamide, in particular benzene-1,3,5-tricarboxylic acid -tris-N,N-Diallylamide (referred to as MOS herein), benzene-1,2,4-tricarboxylic acid -tris-N,N-Diallylamide,benzene-1,4-dicarboxylic acid-di-N,N-diallylamide (referred to as MPD herein).

The counterion X⁻ may be selected from or consist of the group consisting of halide, in particular chloride or fluoride, sulfate, sulfonate (such as 2-acrylamido-2-methylpropane sulfonate (AMPS)), sulfamate, phosphonate (in particular a vinyl phosphonate), lactate, acetate, glycolate, citrate and itaconate. Typically, the counter-ions are anions selected from the group consisting of sulfate, sulfonate, sulfamate, phosphonate, lactate and acetate, glycolate, citrate and itaconate. Suitably, the counter-ion X⁻ comprises one or more of a basic nitrogen group and a phosphonate group.

According to one embodiment, the anionic counter-ion includes a group polymerisable under the conditions used to polymerise the polymeric precursor, such as an alkenyl group.

According to one embodiment, the counter ion X includes basic nitrogen groups.

According to one embodiment, the counter ion includes a phosphonate group.

The counter-ion may have the structure of the group consisting of:

Halide, in particular chloride; glycolate; citrate; or itaconate.

According to one embodiment, the counter-ion may include a polymerisable group, and the counterion may be polymerised under the conditions used to polymerise the polymeric precursor of Formulae I or II. Generally, the counter-ion includes at least one alkenyl group.

Where the substrate is metal, the counter ion may include a phosphonate group, in particular a vinyl phosphonate group.

Typically, the nitrogen cation specified in Formulae I and II is the only cation included in the compounds of Formulae I and II, and a compound of Formula I or II has an associated charge of +1. Generally, the counter-ion has an associated charge of −1.

The compound of Formula I or Formula II and the counter-ion are generally present in the composition at approximately equimolar amounts to provide a charge balanced composition.

According to one embodiment, the salt includes a single type of compound according to Formula I or Formula II.

Generally, the salt comprises a single type of counter-ion.

The polymer may be cross-linked or straight chain.

Where the second polymeric precursor includes a compound of formula A where $R^6$ does not represent a quaternary ammonium cation, the water solubility of the second polymeric precursor is generally low, typically having a water solubility of less than 0.2 wt. %, suitably less than 0.1% by weight at ambient temperature and pressure. In contrast, where the second polymeric precursor includes a compound of formula I or II, the second polymeric precursor is generally water soluble at ambient temperature and pressure, suitably having a water solubility of 40% w/w or more, typically 50% w/w or more at ambient temperature and pressure.

Compositions

The compound including at least one thiol group is generally comprised in a composition, typically including 40 wt. % or less compound including at least one thiol group, generally including 30 wt. % or less, suitably including 20 wt. % or less compound including at least one thiol group.

Where the composition is used for bonding to latex and rubber, the composition generally includes 10 wt. % or less compound including at least one thiol group, generally includes 7 wt. % or less, suitably includes 5 wt. % or less compound including at least one thiol group. Where the composition is intended for direct application to a substrate, such as nylon and/or direct application to the second polymeric precursor, the composition generally includes 3 wt. % or less compound including at least one thiol group, generally includes 2 wt. % or less, suitably includes 1 wt. % or less compound including at least one thiol group. However, this is dependent on ease of bonding to the textile. For textiles which prove difficult to bond to, both precursors may be applied at from 7.wt % or less, generally both precursors are applied at around 5 wt. % solution/emulsion to achieve a high level of bonding.

According to one embodiment, the composition including at least one thiol group is intended to be added to or provided on a rubber composition, for instance a rubber solution and/or emulsion such as an NBR tie coat or a VP latex (where VP latex is a random ter-polymer of vinyl pyridine, styrene and butadiene monomer dispersed in an aqueous medium). In such embodiments, the composition including at least one thiol group may be added to the rubber at less than 20 wt. %, generally less than 15 wt. %; generally more than 2 wt. %, suitably more than 5 wt. %.

The compound including at least one thiol group generally has a low water solubility, and the composition including the compound including at least one thiol group may incorporate an organic solvent. Mention may be made of organic solvents such as esters, acrylates, glycol ethers, vinyl ethers, allyl ethers and aromatic hydrocarbons.

Typically, the composition comprising the compound including at least one thiol group does not include isocyanate. The composition comprising the compound including at least one thiol group may be in the form of a solution, a resin or an emulsion, suitably an emulsion. Generally, the composition comprising the compound including at least one thiol group is in the form of a latex, a tie resin or a tie composition.

The second polymeric precursor is generally in the form of a composition including less than 10 wt. % compound of formulae A, I or II; generally, less than 5 wt. %, suitably 2 to 4 wt. %; typically, 2 to 3 wt. %. For harder to bond to textiles, compositions including a higher concentration of second polymeric precursor and/or thiol containing compound. According to one embodiment, the composition may include 4 to 6 wt. % for textiles which prove hard to bond to.

Where the second polymeric precursor has the structure of formulae I or II, the composition is generally aqueous. Generally, the composition of the present invention includes 1 wt. % or less volatile organic compound (VOC), where a VOC may be defined as an organic compound having an initial boiling point less than or equal to 250° C. measured at a standard atmospheric pressure of 101.3 kPa. Suitably the composition or system of the present invention includes less than 0.01 wt. % VOC. such organic solvents are potentially hazardous both for human health and for the environment, leading to concerted efforts to reduce or remove their presence in adhesives and coatings. However, up to now the reduction or removal of such organic solvents has negatively impacted on the performance of adhesives and coatings. In contrast, the compounds of the present invention may be applied in an aqueous solution to a substrate. As the compounds of the present invention are soluble in water, the coating applied is even and regular. Following application, volatile organic compounds are therefore not evaporated from the substrate. The compounds and methods of the present invention are therefore associated with environmental advantages compared to prior art non-cationic polymeric precursors which are generally provided in VOC solvent-based compositions and systems.

Where the second polymeric precursor has the structure of formulae I or II, the composition including the second polymeric precursor generally incorporates an aqueous solvent rather than an organic solvent. Typically, the amount of organic solvent in the composition is less than 0.1 wt. %, suitably the composition does not contain any organic solvent.

Where the second polymeric compound has the structure of formula A and $R^6$ does not represent a cation, for instance a quaternary ammonium cation, the second polymeric precursor is not generally water soluble. In such embodiment, the composition including the second polymeric precursor generally incorporates an organic solvent. According to one embodiment, the composition including the second polymeric precursor is generally in the form of an emulsion where the second polymeric compound has the structure of formula A and $R^6$ does not represent a cation.

The composition including the second polymeric precursor and/or the composition comprising the compound including at least one thiol group may include polymerisation initiators or catalysts to initiate polymerisation. Mention may be made of catalysts such as free radical generators such as peroxides, azo compounds, and persulphates.

Polymerisation of the compound including at least one thiol group and/or the second polymeric precursor may be via thermal or UV initiation. Generally, polymerisation of the compound including at least one thiol group and/or the second polymeric precursor is initiated thermally.

The composition comprising the compound including at least one thiol group and/or the composition including the second polymeric precursor may include a stabiliser.

The compound including at least one thiol group and the second polymeric precursor may be applied to the sulphur curable rubber composition, and/or to the substrate in a single composition. Suitably the composition is in the form of an emulsion.

According to a further aspect of the present invention, there is provided an emulsion including an oil phase comprising the compound including at least one thiol group and an aqueous phase comprising a second polymeric precursor including a compound of formula I or II as defined herein.

Substrate

Generally, but not exclusively the substrate is a low energy substrate such as a polymeric substrate, in particular a rubber substrate (sulphur cured or other), an elastomeric substrate or a metal substrate. The substrate suitably has a surface energy of less than or equal to 42 mJ/m².

According to some embodiments, the substrate is not a low surface energy substrate, for instance the substrate may be in the form of glass or a textile such as cloth.

The substrate is generally a textile. Alternatively, the substrate may be in the form of a surface formed from metal, glass, plastics, rubber.

The textile fibres may be natural or synthetic fibres. Examples of synthetic textile fibres which may be treated in accordance with the invention are aramid, nylon and polyester. Thus, the treated textile fibres may include aramid, nylon or polyester fibres. The textile fibres may consist entirely of aramid fibres, or may comprise a mixture of aramid fibres and fibres of at least one other kind. The aramid fibres may be meta-aramid fibres and/or para-aramid fibres. Examples of suitable aramid fibres are Kevlar®, Kermel® and Twaron®. Examples of mixtures of aramid fibres with fibres of another kind or kinds include various mixtures of aramid fibres with viscose fibres, which may be flame retardant (FR) viscose fibres. Blends such as a 50% aramid/50% FR viscose mixture or a mixture of para-aramid, rayon and polybenzimidazole fibres may be used.

Composite

According to a further aspect of the present invention, there is provided a composite including a substrate, a sulphur cured rubber and a polymeric layer disposed therebetween, wherein the polymeric layer is formed through the reaction (generally the polymerisation) of the compound including at least one thiol group, and the second polymeric precursor including a compound of formula A or II as defined herein.

Generally, the polymeric layer is bonded to the sulphur cured rubber through covalent bonds. Generally, the polymeric layer is bonded to a synthetic textile substrate through intermolecular forces, more specifically Hydrogen bonding. For non-synthetic, natural textiles such as cotton, the polymeric layer may be bonded through covalent bonds.

Generally, the bond strength between the polymeric layer and the sulphur cured rubber is at least 2000 N/m; typically, at least 5000 N/m; suitably at least 8000 N/m; more suitably at least 12000 N/m; preferably greater than 15000 N/m.

According to one embodiment, the composite may include more than one layer of sulphur cured rubber, and/or more than one layer of substrate. Generally, each layer of the composite is bonded to adjacent layers with the polymeric layer formed through the polymerisation of the compound including at least one thiol group and the second polymeric precursor.

Each polymeric layer may be formed through the reaction of the same or different compounds including at least one thiol group, and/or the same or different second polymeric precursors.

The composite may be in the form of a textile layer between two sulphur cured rubber layers.

Alternatively, the composite may include layers of different substrates, each bonded to a sulphur cured rubber layer.

The different substrates may be different textiles. Alternatively, the substrates may be selected from the group consisting of elastomeric substrates, textiles, metal and glass.

The composite may be in the form of, or may be used to form moulded rubber goods, conveyor belts, timing belts (automotive), tyres, diaphragms, power transmission belts, hoses etc.

Specific Embodiments

According to one embodiment there is provided a method of forming a polymer coated sulphur cured rubber composition including:
  i. providing a sulphur curable rubber composition comprising a compound including at least one thiol group for instance, selected from the group consisting of PETMP, EDDT, TMPEIC and 2,4,6-Trimercaptotriazine;
  ii. contacting the sulphur curable rubber composition with a second polymeric precursor including a compound of formula A, (preferably formula I) or II iii. reacting the compound including at least one thiol group and the second polymeric precursors to form a polymeric layer, and
  curing the sulphur curable rubber composition to form a polymer coated sulphur cured rubber composition.

Generally the ratio of diallylamide groups to thiol groups is 1:5 to 20, typically 1:7 to 17, suitably around 1:7 to 8 or around 1:15.

According to one embodiment there is provided a method of forming a polymer coated sulphur cured rubber composition including:
  i. providing a sulphur curable rubber composition;
  ii. contacting the sulphur curable rubber composition with a composition including the compound including at least one thiol group and the second polymeric precursor;
  iii. polymerising the first and second polymeric precursors to form a polymeric layer; and
  iv. curing the sulphur curable rubber composition to form a polymer coated sulphur cured rubber composition.

According to one embodiment there is provided a method of bonding a sulphur cured rubber to a substrate comprising;
  providing a sulphur curable rubber composition;
  providing a substrate;
  contacting the substrate with a composition including the second polymeric precursor;
  contacting the substrate with a composition comprising the compound including at least one thiol group;
  disposing the coated substrate proximate to the sulphur curable rubber composition;
  reacting the compound including at least one thiol group and the second polymeric precursors to form a polymeric layer;
  curing the sulphur curable rubber composition.

Generally, both of the compound including at least one thiol group and the second polymeric precursor are polymerised. Alternatively, the second polymeric precursor is polymerised.

Generally, the method includes the steps of:
  i) applying the compound including at least one thiol group and the second polymeric precursor to the textile fibres; and
  ii) polymerising the compound including at least one thiol group and the second polymeric precursor so as to produce a polymeric coating on the textile fibres.

Kit of Parts

According to a further aspect of the present invention, there is provided a kit of parts for use in a method of forming a polymer coated sulphur cured rubber composition and/or for use in a method of bonding a sulphur cured rubber to a substrate. The kit of parts includes a composition comprising a compound including at least one thiol group and a composition comprising a second polymeric precursor including a compound of formula A or II as defined herein.

According to an aspect of the present invention, the kit includes a substrate, a sulphur curable composition, a composition comprising a compound including at least one thiol group and a composition comprising a second polymeric precursor including a compound of formula A or II as defined herein.

The kit of parts may include a device to apply the compositions, such as a syringe, spatula, or spray device.

According to one embodiment, the kit may include a coating device.

According to a further embodiment, the kit may include a container suitable for immersion of the substrates to be bonded, such as an immersion or dipping bath.

Generally, the kit includes instructions for use, for example the nature of application and the reaction conditions required to initiate polymerisation.

The present invention will now be described by way of example only with reference to the following figures in which.

EXAMPLE 1a

A composition including a polymeric precursor of formula A was applied to a nylon sheet. The coated nylon sheet was placed next to unvulcanised sulphur curable SBR. Heat and pressure were applied to each side of the resultant laminate to cure the SBR and to polymerise the polymeric precursor of formula A. A styrene butadiene rubber-nylon laminate comprising a polymeric layer formed from the polymeric precursor of formula A disposed between a sulphur cured SBR layer and a nylon layer was formed accordingly.

Figure 1:
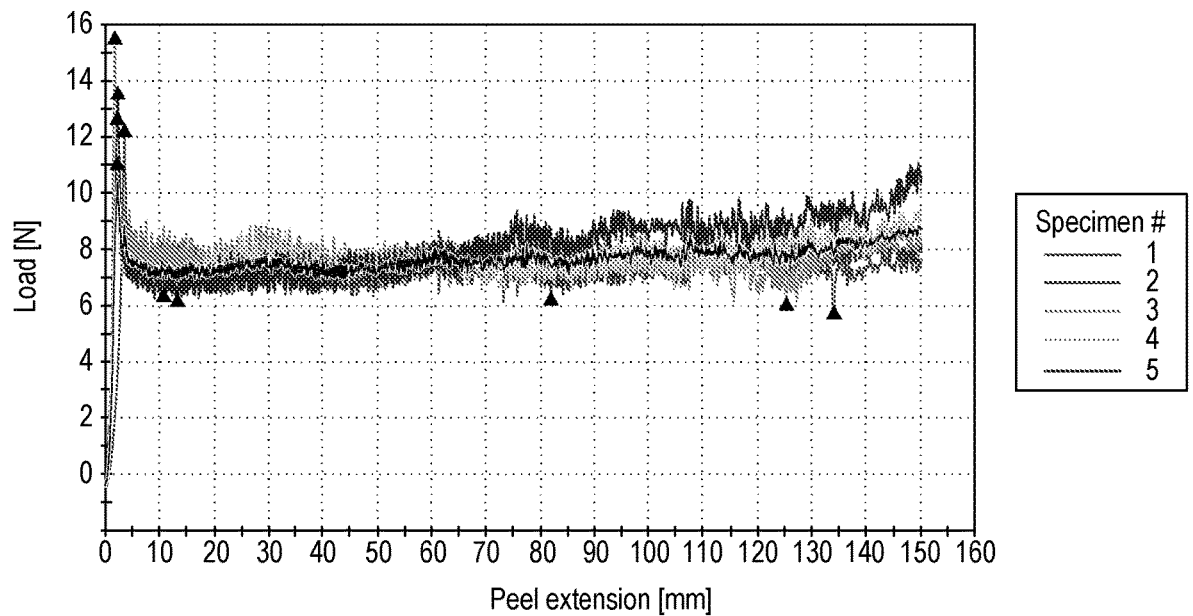
FIG. 1 shows the peel strength of a polymeric layer formed from polymeric precursor of formula A disposed between a sulphur cured styrene butadiene rubber layer and a nylon layer in a styrene butadiene rubber-nylon laminate.

Specimens 25 mm wide were cut from the resultant laminate, and the strength of the polymeric layer was tested using the standard test method for peel resistance for adhesives, namely the T-peel test. The laminated test panels were peeled at a constant head speed of 254 mm/min. The results are provided in FIG. 1 and the table 1a below:

TABLE 1a

|  | First Peak Load [N] | Min Peel Load [N] | Max Peel Load [N] | Average Load [N] | Average Load/Width [N/m] |
| --- | --- | --- | --- | --- | --- |
| 1 | 12.26 | 5.81 | 12.26 | 7.38 | 295.27 |
| 2 | 11.08 | 6.29 | 11.08 | 7.48 | 299.02 |
| 3 | 15.55 | 6.11 | 15.55 | 7.71 | 308.43 |
| 4 | 12.68 | 6.42 | 12.68 | 7.73 | 309.32 |
| 5 | 13.58 | 6.24 | 13.58 | 8.17 | 326.80 |
| Mean | 13.03 | 6.17 | 13.03 | 7.69 | 307.77 |
| Standard deviation | 1.67 | 0.23 | 1.67 | 0.31 | 12.23 |

The average load per unit width of the polymeric layer was 307.77 N/m (standard deviation 12.23 N/m).

EXAMPLE 1b

Figure 2:
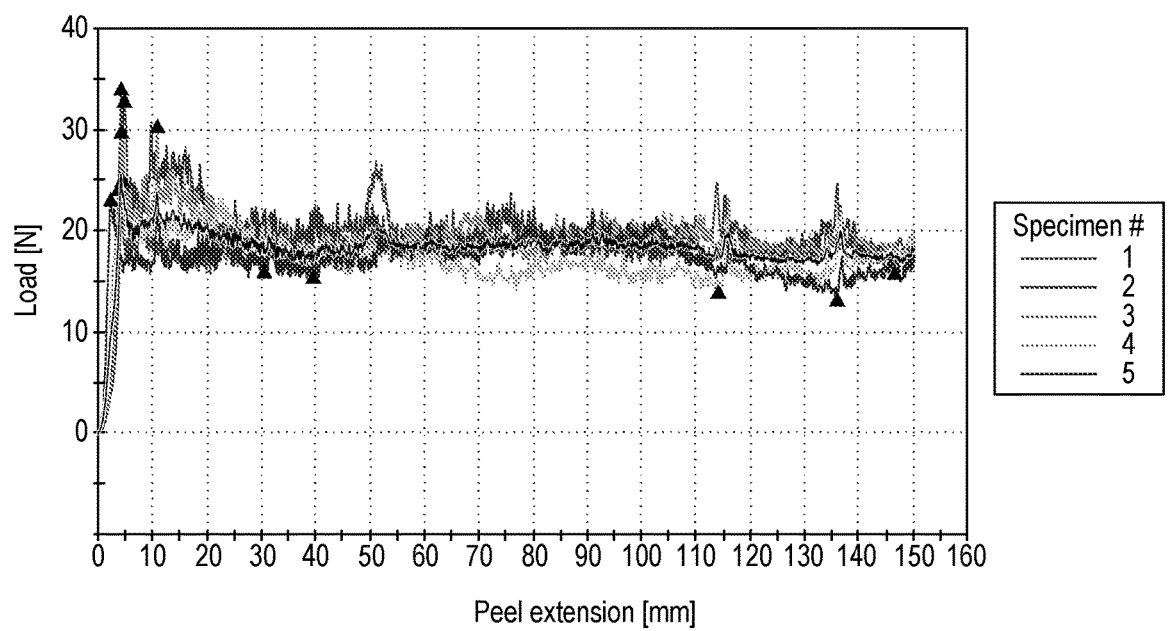
FIG. 2 shows the peel strength of a polymeric layer formed from polymeric precursor pentaerythritol tetra (3-mercaptopropionate)(PETMP) disposed between a sulphur cured styrene butadiene rubber layer and a nylon layer in a styrene butadiene rubber-nylon laminate.

The method of Example 1a was repeated substituting the polymeric precursor of formula A with a composition including PETMP. Specimens 25 mm wide were cut from the resultant laminate, and the strength of the polymeric layer was tested using the T-peel test. The results are provided in FIG. 2 and the table 1b below:

TABLE 1b

|   | First Peak Load [N] | Min Peel Load [N] | Max Peel Load [N] | Average Load [N] | Average Load/Width [N/m] |
|---|---|---|---|---|---|
| 1 | 34.04 | 15.54 | 34.04 | 18.82 | 752.78 |
| 2 | 32.86 | 15.93 | 32.86 | 19.89 | 795.44 |
| 3 | 29.85 | 16.09 | 30.38 | 19.46 | 778.22 |
| 4 | 24.19 | 14.08 | 25.10 | 17.46 | 698.21 |
| 5 | 23.16 | 13.33 | 23.16 | 17.56 | 702.39 |
| Mean | 28.82 | 14.99 | 29.11 | 18.64 | 745.41 |
| Standard deviation | 4.95 | 1.22 | 4.78 | 1.10 | 43.91 |

The average load per unit width of the polymeric layer was 745.41 N/m (standard deviation 43.91 N/m).

EXAMPLE 1c

Figure 3:
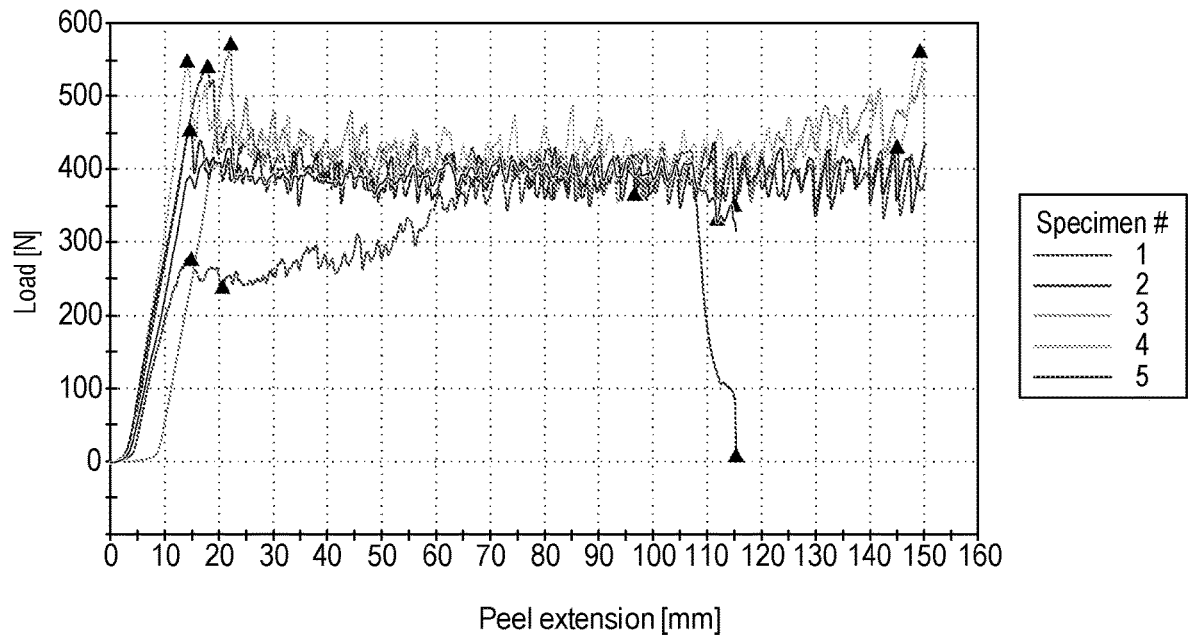
FIG. 3 shows the peel strength of a polymeric layer formed from the polymeric precursor of formula A of FIG. 1 and from polymeric precursor pentaerythritol tetra (3-mercaptopropionate) (PETMP) disposed between a sulphur cured styrene butadiene rubber layer and a nylon layer in a styrene butadiene rubber-nylon laminate.

The method of Example 1a was repeated but the textile was contacted first with the composition including the polymeric precursor of formula A of Example 1a and then with the PETMP composition of Example 1b. Specimens 25 mm wide were cut from the resultant laminate, and the strength of the polymeric layer was tested using the T-peel test. The results are provided in FIG. 3 and the table 1c below:

TABLE 1c

|   | First Peak Load [N] | Min Peel Load [N] | Max Peel Load [N] | Average Load [N] | Average Load/Width [N/m] |
|---|---|---|---|---|---|
| 1 | 278.04 | 240.10 | 431.72 | 350.85 | 14034.17 |
| 2 | 542.05 | 10.53 | 542.05 | 387.37 | 15494.98 |
| 3 | 572.92 | 352.53 | 572.92 | 422.12 | 16884.92 |
| 4 | 549.26 | 367.76 | 562.86 | 433.19 | 17327.49 |
| 5 | 455.21 | 333.91 | 455.21 | 392.30 | 15692.12 |
| Mean | 479.50 | 260.97 | 512.95 | 397.17 | 15886.73 |
| Standard deviation | 121.12 | 148.54 | 64.94 | 32.34 | 1293.78 |

The average load per unit width of the polymeric layer was 15,886.73 N/m (standard deviation 1,293.78 N/m).

This demonstrates a very surprising synergistic effect from application of the thiol containing compound and the diallylamide polymeric precursor. The bond strength of the polymeric layer increased by around 2000%.

EXAMPLE 1d

Figure 4:
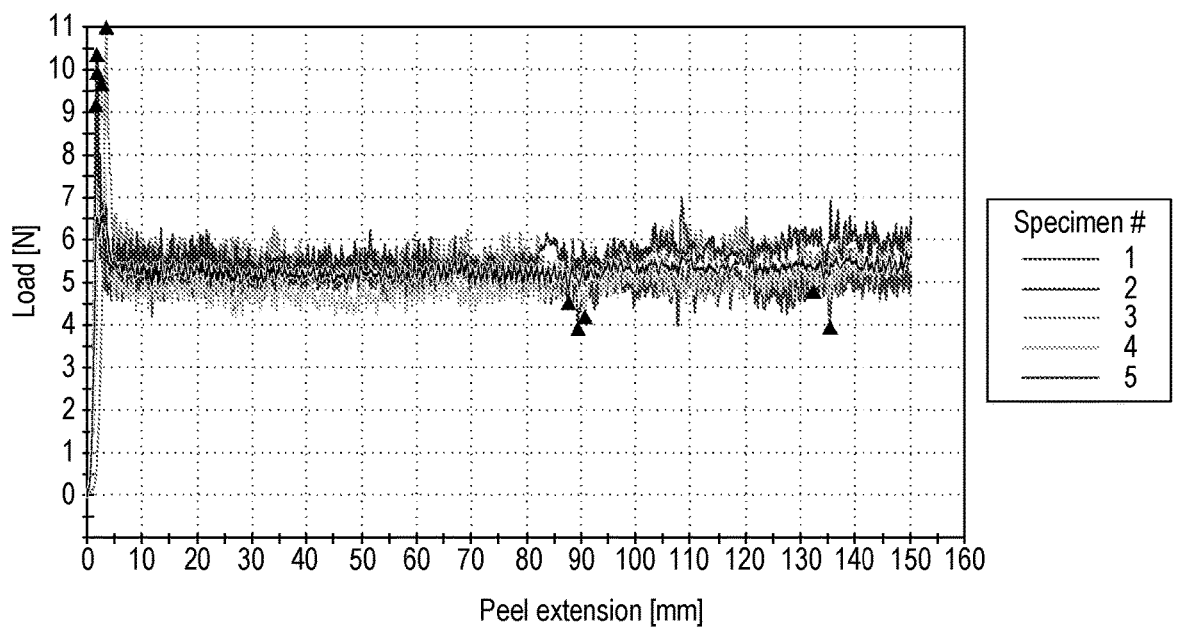
FIG. 4 shows the peel strength of a control sulphur cured styrene butadiene rubber-nylon laminate without a polymeric layer disposed between the styrene butadiene rubber and the nylon layers.

For completeness, as a control the method of Example 1a was repeated with no polymeric layer between the nylon layer and the sulphur cured rubber composition. The nylon layer was adhered to the rubber during curing thereof. Specimens 25 mm wide were cut from the resultant laminate, and the strength of the bond between the rubber composition and the nylon layer was tested using the T-peel test. The results are provided in FIG. 4 and the table 1d below:

TABLE 1d

|   | First Peak Load [N] | Min Peel Load [N] | Max Peel Load [N] | Average Load [N] | Average Load/Width [N/m] |
|---|---|---|---|---|---|
| 1 | 10.35 | 3.96 | 10.35 | 5.24 | 209.70 |
| 2 | 9.16 | 3.93 | 9.16 | 5.05 | 201.81 |
| 3 | 10.98 | 4.79 | 10.98 | 5.62 | 224.96 |

TABLE 1d-continued

|   | First Peak Load [N] | Min Peel Load [N] | Max Peel Load [N] | Average Load [N] | Average Load/Width [N/m] |
|---|---|---|---|---|---|
| 4 | 9.66 | 4.21 | 9.66 | 4.96 | 198.45 |
| 5 | 9.93 | 4.53 | 9.93 | 5.65 | 225.84 |
| Mean | 10.01 | 4.28 | 10.01 | 5.30 | 212.15 |
| Standard deviation | 0.69 | 0.37 | 0.69 | 0.32 | 12.77 |

The average load per unit width of the polymeric layer was 212.15 N/m (standard deviation 12.77N/n).

EXAMPLE 2a

The method of Example 1a was repeated wherein the polymeric layer was formed from a composition including a polymeric precursor of formula I applied to the nylon sheet.

Figure 5:
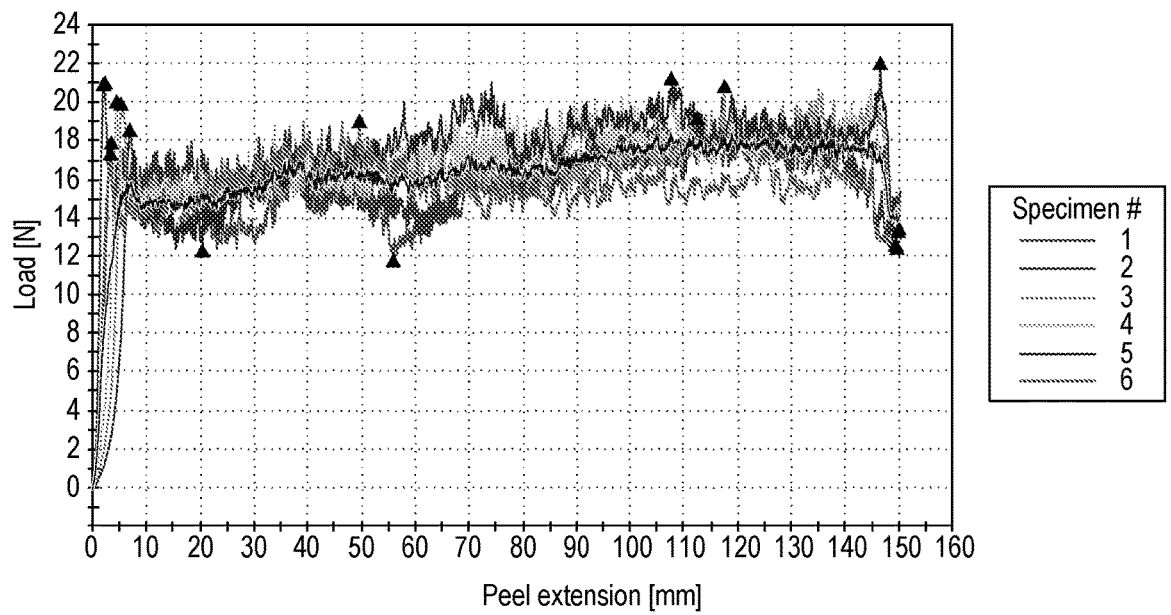
FIG. 5 shows the peel strength of a polymeric layer formed from polymeric precursor comprising compounds of formula I disposed between a styrene butadiene rubber and a nylon layer in a styrene butadiene rubber-nylon composite.

Specimens 25 mm wide were cut from the resultant laminate, and the strength of the polymeric layer was tested using the T-peel test. The results are provided in FIG. 5 and the table 2a below:

TABLE 2a

|   | First Peak Load [N] | Min Peel Load [N] | Max Peel Load [N] | Average Load [N] | Average Load/Width [N/m] |
|---|---|---|---|---|---|
| 1 | 17.93 | 11.79 | 19.20 | 15.74 | 629.43 |
| 2 | 20.94 | 12.62 | 21.01 | 16.43 | 657.32 |
| 3 | 19.92 | 13.47 | 20.83 | 16.81 | 672.44 |
| 4 | 20.04 | 13.31 | 21.25 | 17.16 | 686.25 |
| 5 | 18.57 | 12.31 | 22.05 | 17.58 | 703.28 |
| 6 | 17.36 | 12.44 | 19.03 | 15.66 | 626.50 |
| Mean | 19.12 | 12.66 | 20.56 | 16.56 | 662.54 |
| Standard deviation | 1.39 | 0.63 | 1.20 | 0.77 | 30.80 |

The average load per unit width of the polymeric layer was 662.54 N/m (standard deviation 30.80 N/m).

EXAMPLE 2b

Figure 6:
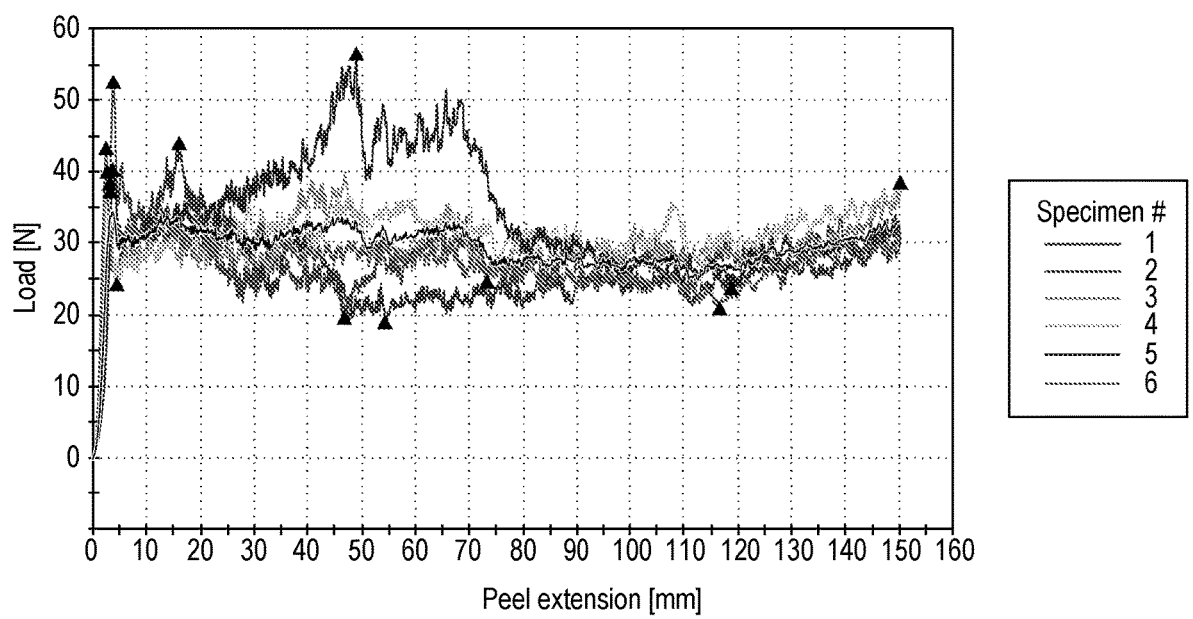
FIG. 6 shows the peel strength of a polymeric layer formed from thiol PETMP disposed between a styrene butadiene rubber layer and a nylon layer in a styrene butadiene rubber-nylon composite.

The method of Example 2a was repeated substituting the composition including the polymeric precursor with a composition including thiol containing compound PETMP. Specimens 25 mm wide were cut from the resultant laminate, and the strength of the polymeric layer was tested using the T-peel test. The results are provided in FIG. 6 and the table 2b below:

TABLE 2b

|   | First Peak Load [N] | Min Peel Load [N] | Max Peel Load [N] | Average Load [N] | Average Load/Width [N/m] |
|---|---|---|---|---|---|
| 1 | 52.63 | 19.64 | 52.63 | 28.32 | 1132.65 |
| 2 | 38.43 | 19.08 | 44.07 | 26.35 | 1054.09 |
| 3 | 40.13 | 24.67 | 40.13 | 30.20 | 1207.89 |
| 4 | 37.33 | 24.36 | 38.60 | 31.67 | 1266.73 |
| 5 | 40.35 | 23.79 | 56.51 | 34.28 | 1371.24 |
| 6 | 43.38 | 20.95 | 43.38 | 27.70 | 1108.06 |
| Mean | 42.04 | 22.08 | 45.89 | 29.75 | 1190.11 |
| Standard deviation | 5.58 | 2.49 | 7.13 | 2.91 | 116.22 |

The average load per unit width of the polymeric layer was 1190.11 N/m (standard deviation 116.22 N/m).

EXAMPLE 2c

Figure 7:
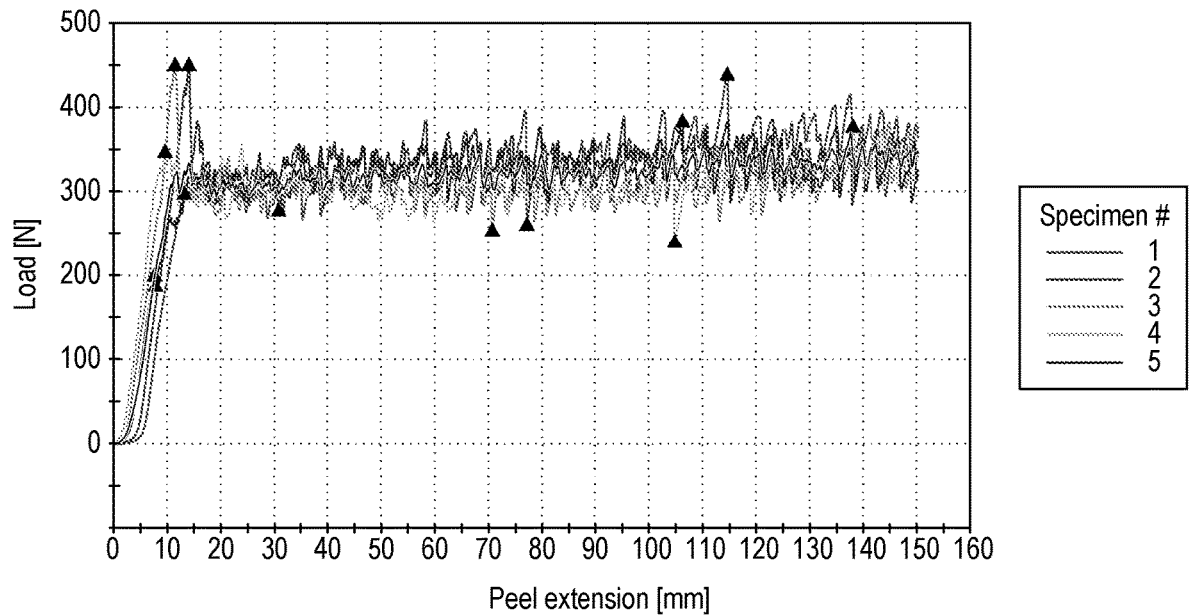
FIG. 7 shows the peel strength of a polymeric layer formed from the polymeric precursor comprising compounds of formula I of FIG. 5 and from polymeric precursor thiol PETMP disposed between a styrene butadiene rubber layer and a nylon layer in a styrene butadiene rubber-nylon composite.

The method of Example 2a was repeated but the textile was contacted first with the composition including the polymeric precursor of formula I of Example 2a and then with the composition including thiol PETMP of Example 2b. Specimens 25 mm wide were cut from the resultant laminate, and the strength of the polymeric layer was tested using the T-peel test. The results are provided in FIG. 7 and the table 2c below:

TABLE 2c

|   | First Peak Load [N] | Min Peel Load [N] | Max Peel Load [N] | Average Load [N] | Average Load/Width [N/m] |
|---|---|---|---|---|---|
| 1 | 299.68 | 262.76 | 440.64 | 333.23 | 13329.08 |
| 2 | 451.99 | 279.85 | 451.99 | 334.66 | 13386.22 |
| 3 | 451.76 | 255.77 | 451.76 | 311.14 | 12445.52 |
| 4 | 348.86 | 242.28 | 378.68 | 310.03 | 12401.03 |
| 5 | 201.61 | 189.71 | 385.21 | 327.94 | 13117.57 |
| Mean | 350.78 | 246.08 | 421.65 | 323.40 | 12935.88 |
| Standard deviation | 106.43 | 34.30 | 36.61 | 11.97 | 478.78 |

The average load per unit width of the polymeric layer was 12,935.88 N/m (standard deviation 478.78 N/m).

This demonstrates asynergistic effect from application of the thiol containing compound and the diallylamide polymeric precursor. The bond strength of the polymeric layer increased by around 1000%. In addition, no volatile organic compounds were required.

EXAMPLE 2d

Figure 8:
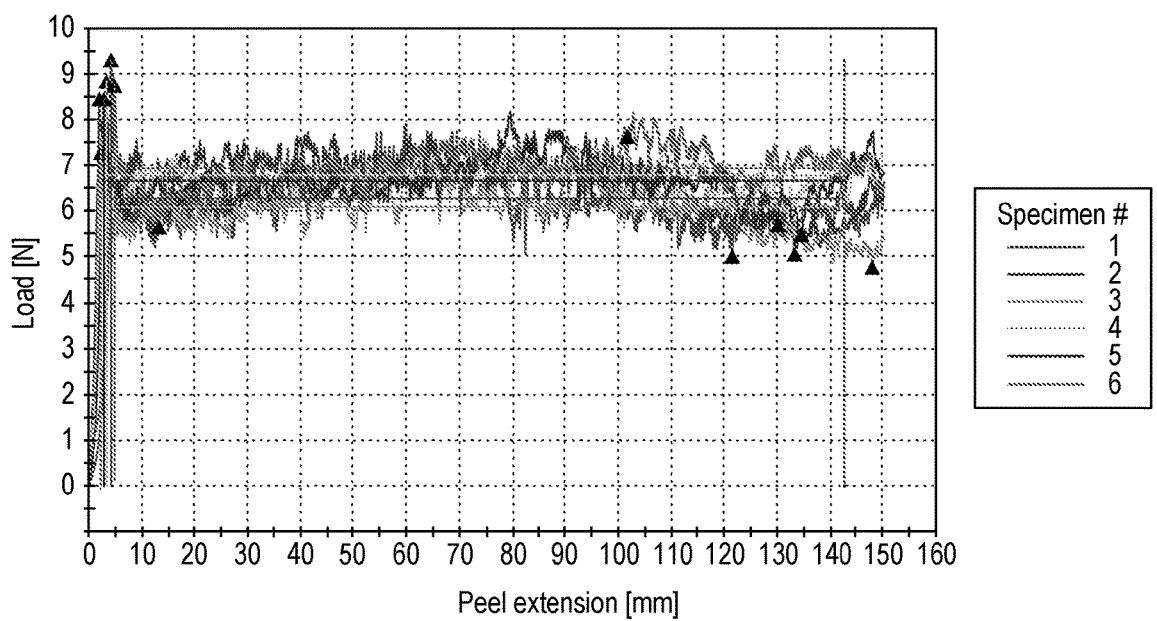
FIG. 8 shows the peel strength of a control styrene butadiene rubber-nylon laminate without a polymeric layer disposed between the styrene butadiene rubber and the nylon layers.

For completeness, as a control the method of Example 2a was repeated with no polymeric layer between the nylon layer and the sulphur cured rubber composition. The nylon layer was adhered to the rubber during curing thereof. Specimens 25 mm wide were cut from the resultant laminate, and the strength of the adhesive layer was tested using the T-peel test. The results are provided in FIG. 8 and the table 2d below:

TABLE 2d

|   | Loat at Peak first (Primary load measurement) [N] | Minimum Peel Load [N] | Maximum Peel Load [N] | Average Load at Average value (5 Peaks and troughs) [N] | Average Load/Width at Average value (5 Peaks and troughs) [N/m] |
|---|---|---|---|---|---|
| 1 | 9.31 | 5.02 | 9.31 | 6.29 | 251.76 |
| 2 | 8.46 | 5.07 | 8.46 | 6.69 | 267.57 |
| 3 | 7.29 | 4.79 | 7.65 | 6.10 | 243.89 |
| 4 | 8.85 | 5.70 | 8.85 | 6.80 | 271.95 |
| 5 | 8.46 | 5.49 | 8.46 | 6.68 | 267.37 |
| 6 | 8.76 | 5.66 | 8.76 | 6.96 | 278.43 |
| Mean | 8.52 | 5.29 | 8.58 | 6.59 | 263.49 |
| Standard deviation | 0.68 | 0.38 | 0.55 | 0.33 | 13.02 |

The average load per unit width of the polymeric layer was 263.49 N/m (standard deviation 13.02 N/m).

EXAMPLE 2e

Figure 9:
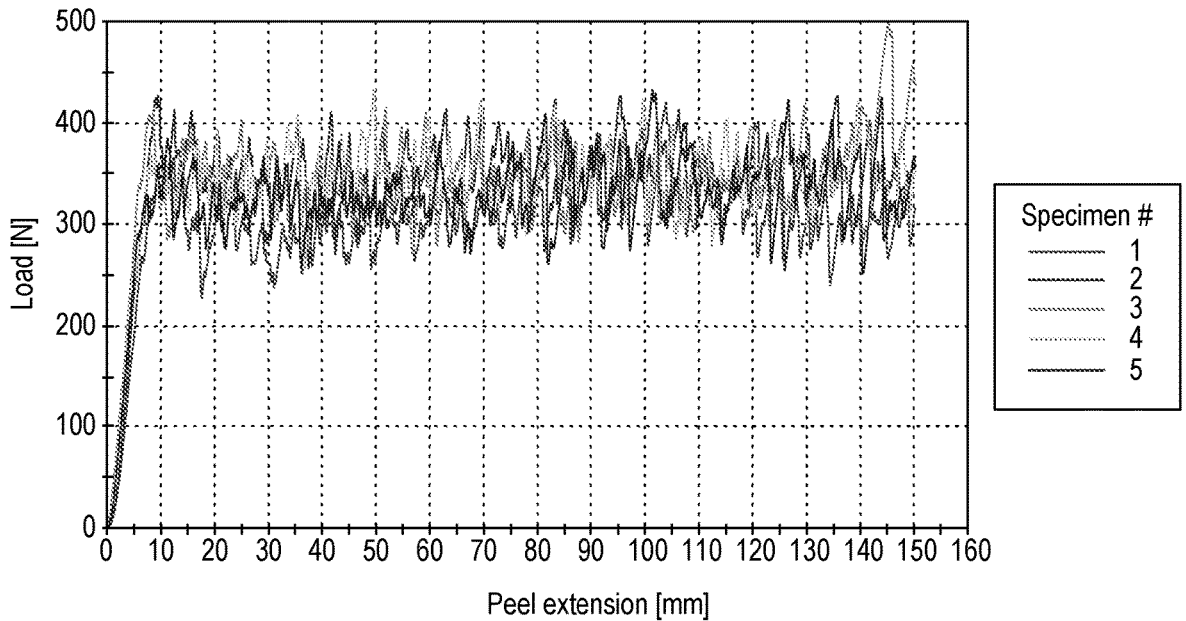
FIG. 9 shows the peel strength of a polymeric layer formed from polymeric precursor comprising compounds of formula I of FIG. 5 and from polymeric precursor thiol PETMP in a fully aqueous system disposed between a styrene butadiene rubber layer and a nylon layer in a styrene butadiene rubber-nylon composite.

The method of Example 2c was repeated wherein the composition including the polymeric precursor of formula I of Example 2a and the composition including the thiol PETMP of Example 2b were aqueous compositions. The concentrations of the compositions remained the same. The results are provided in FIG. 9 and the table 2e below:

TABLE 2e

|   | First Peak Load [N] | Min Peel Load [N] | Max Peel Load [N] | Average Load [N] | Average Load/Width [N/m] |
|---|---|---|---|---|---|
| 1 | 351.87 | 228.40 | 421.80 | 314.60 | 12583.88 |
| 2 | 313.41 | 255.41 | 428.36 | 348.23 | 13929.40 |
| 3 | 407.92 | 271.57 | 499.23 | 344.80 | 13792.02 |
| 4 | 264.71 | 242.19 | 433.98 | 347.40 | 13896.10 |
| 5 | 329.81 | 251.89 | 433.13 | 334.02 | 13360.88 |
| Mean | 333.54 | 249.89 | 443.30 | 337.81 | 13512.45 |
| Standard deviation | 52.50 | 16.01 | 31.64 | 14.17 | 566.66 |

The average load per unit width of the polymeric layer was 13,513 N/m (standard deviation 567 N/m), again demonstrating a synergistic effect through application of the thiol containing compound and the diallylamide polymeric precursor. The bond strength of the polymeric layer increased by over 1000%. This is a fully aqueous system and unlike other systems known in the art, no drop in bond strength was exhibited when the system was changed from organic to aqueous. In addition, no volatile organic compounds were required.

EXAMPLE 3a

Figure 10:
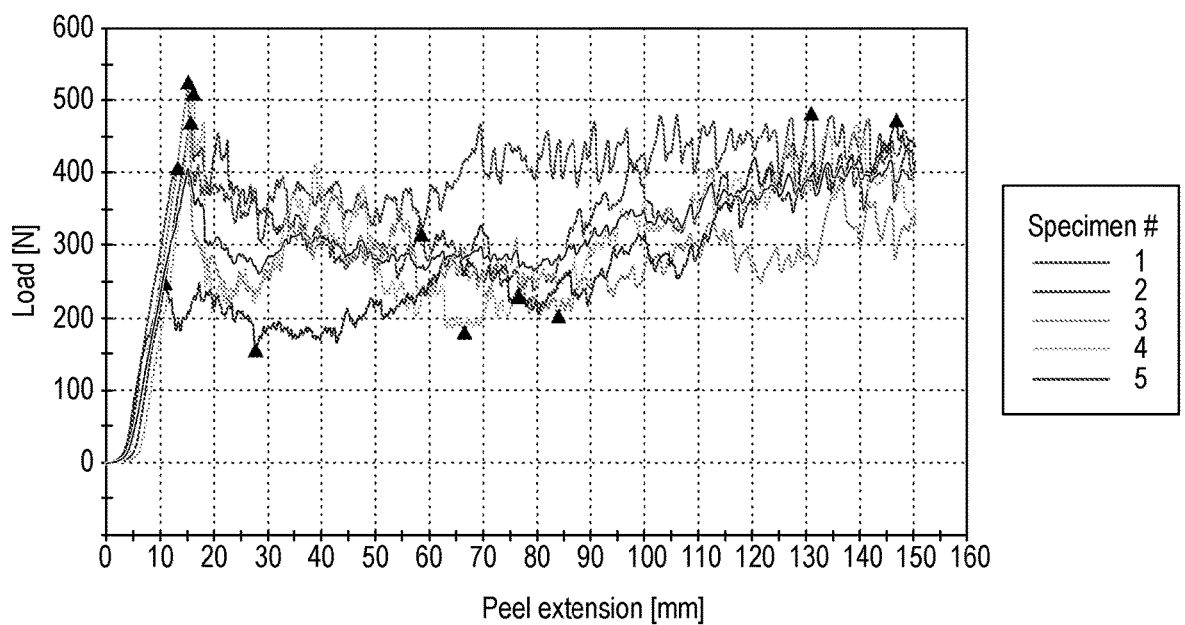
FIG. 10 shows the peel strength of a polymeric layer formed from polymeric precursor comprising compounds of formula I of FIG. 5 and from polymeric precursor thiol PETMP disposed between a styrene butadiene rubber layer and a nylon layer in a styrene butadiene rubber-nylon composite wherein the ratio of diallylamide groups:thiol groups was 1.0:20.3.

The method of Example 2c was repeated. The textile was contacted with a composition including the polymeric precursor of formula I of Example 2c and with a composition including thiol PETMP. The ratio of diallylamide groups:thiol groups was 1.0:20.3. Specimens 25 mm wide were cut from the resultant laminate, and the strength of the polymeric layer was tested using the T-peel test. The results are provided in FIG. 10 and the table 3a below:

TABLE 3a

|   | First Peak Load [N] | Min Peel Load [N] | Max Peel Load [N] | Average Load [N] | Average Load/Width [N/m] |
|---|---|---|---|---|---|
| 1 | 407.24 | 315.78 | 482.17 | 406.79 | 16271.43 |
| 2 | 469.66 | 230.38 | 469.66 | 341.63 | 13665.22 |
| 3 | 525.07 | 203.40 | 525.07 | 284.76 | 11390.55 |
| 4 | 509.21 | 181.20 | 509.21 | 314.76 | 12590.21 |
| 5 | 248.91 | 156.26 | 472.32 | 280.35 | 11213.95 |
| Mean | 432.02 | 217.40 | 491.69 | 325.66 | 13026.27 |
| Standard deviation | 112.00 | 61.42 | 24.35 | 51.67 | 2066.97 |

The average load per unit width of the polymeric layer was 13,026 N/m (standard deviation 2066.97 N/m).

EXAMPLE 3b

Figure 11:
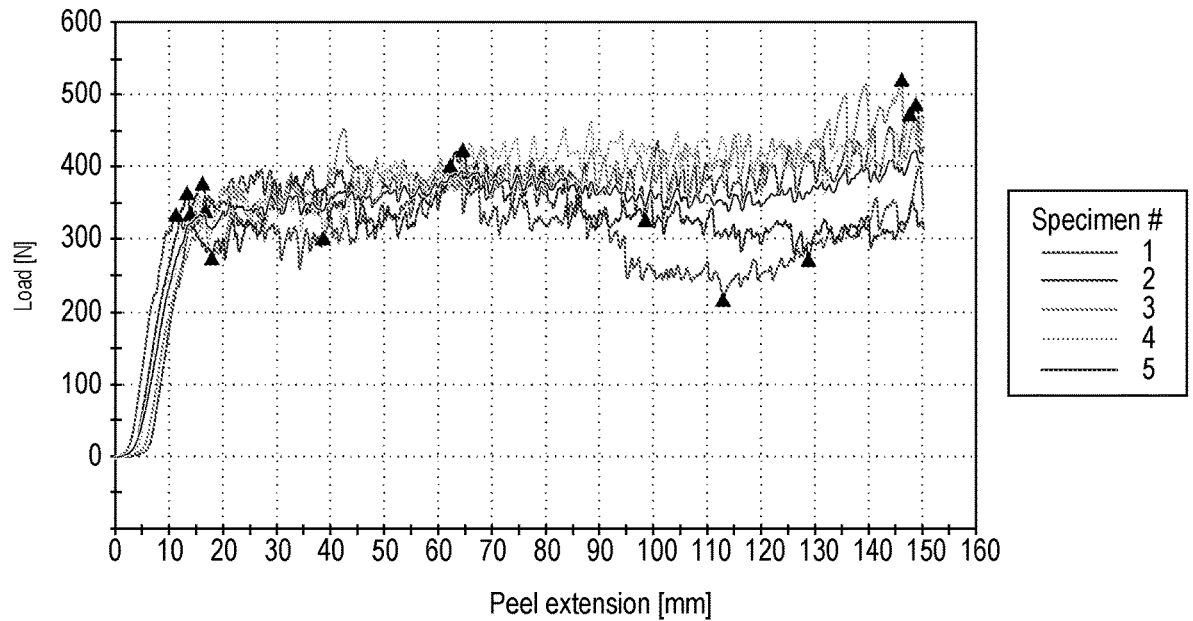
FIG. 11 shows the peel strength of a polymeric layer formed from polymeric precursor comprising compounds of formula I of FIG. 5 and from polymeric precursor thiol PETMP disposed between a styrene butadiene rubber layer and a nylon layer in a styrene butadiene rubber-nylon composite wherein the ratio of diallylamide groups:thiol groups was 1.0:10.6.

The method of Example 3a was repeated. The textile was contacted with a composition including the polymeric precursor of formula I of Example 3a and with a composition including thiol PETMP. The ratio of diallylamide groups:thiol groups was 1.0:10.6. Specimens 25 mm wide were cut from the resultant laminate, and the strength of the polymeric layer was tested using the T-peel test. The results are provided in FIG. 11 and the table 3b below:

TABLE 3b

|   | First Peak Load [N] | Min Peel Load [N] | Max Peel Load [N] | Average Load [N] | Average Load/Width [N/m] |
|---|---|---|---|---|---|
| 1 | 334.72 | 217.88 | 402.45 | 311.93 | 12477.14 |
| 2 | 377.88 | 327.44 | 486.47 | 384.73 | 15389.28 |
| 3 | 339.82 | 274.75 | 520.83 | 396.65 | 15866.01 |
| 4 | 336.48 | 302.30 | 473.07 | 398.55 | 15941.80 |
| 5 | 364.64 | 272.49 | 423.65 | 334.73 | 13389.11 |
| Mean | 350.71 | 278.97 | 461.29 | 365.32 | 14612.67 |
| Standard deviation | 19.42 | 40.88 | 47.95 | 39.52 | 1580.99 |

The average load per unit width of the polymeric layer was 14,613 N/m (standard deviation 1580.99 N/m).

EXAMPLE 3c

Figure 12:
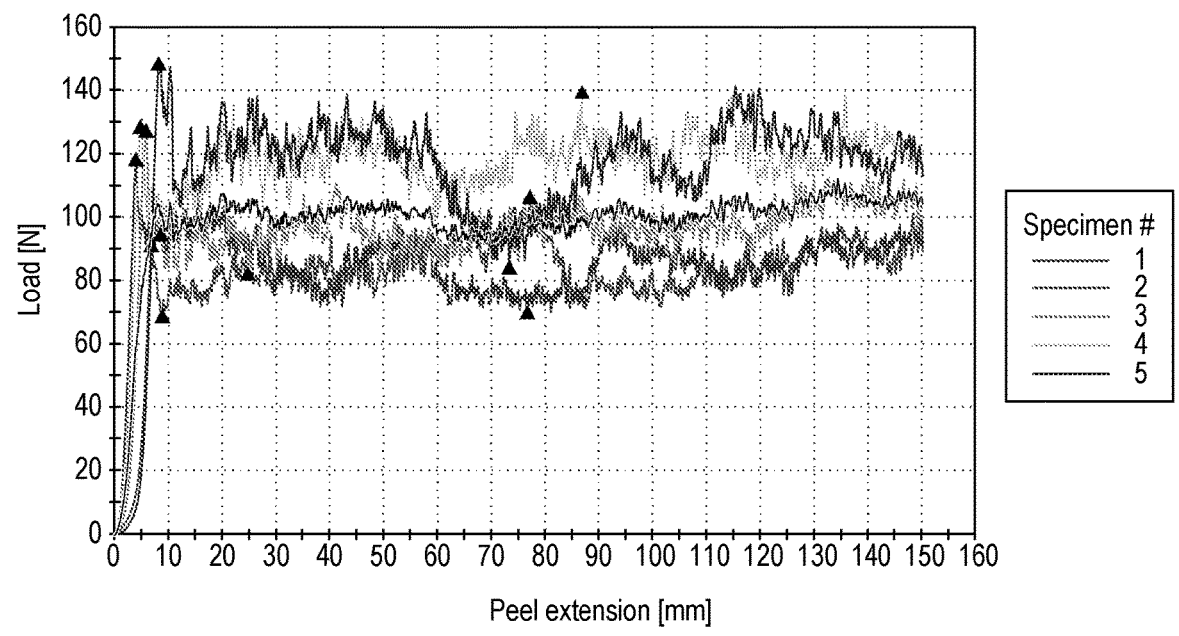
FIG. 12 shows the peel strength of a polymeric layer formed from polymeric precursor comprising compounds of formula I of FIG. 5 and from polymeric precursor thiol PETMP disposed between a styrene butadiene rubber layer and a nylon layer in a styrene butadiene rubber-nylon composite wherein the ratio of diallylamide groups:thiol groups was 1.0:5.7.

The method of Example 3a and 3b was repeated. The textile was contacted with a composition including the polymeric precursor of formula I of Example 3a and with a composition including thiol PETMP. The ratio of diallylamide groups:thiol groups was 1.0:5.7. Specimens 25 mm wide were cut from the resultant laminate, and the strength of the polymeric layer was tested using the T-peel test. The results are provided in FIG. 12 and the table 3c below:

TABLE 3c

|   | First Peak Load [N] | Min Peel Load [N] | Max Peel Load [N] | Average Load [N] | Average Load/Width [N/m] |
|---|---|---|---|---|---|
| 1 | 91.51 | 69.19 | 106.61 | 85.13 | 3405.01 |
| 2 | 118.35 | 70.31 | 118.35 | 86.37 | 3454.86 |
| 3 | 127.41 | 82.50 | 127.41 | 97.36 | 3894.39 |
| 4 | 128.66 | 94.96 | 139.50 | 118.58 | 4743.30 |
| 5 | 148.57 | 84.40 | 148.57 | 118.47 | 4738.97 |
| Mean | 122.90 | 80.27 | 128.09 | 101.18 | 4047.31 |
| Standard deviation | 20.73 | 10.72 | 16.63 | 16.53 | 661.39 |

The average load per unit width of the polymeric layer was 4,047 N/m (standard deviation 661.39 N/m).

EXAMPLE 3d

Figure 13:
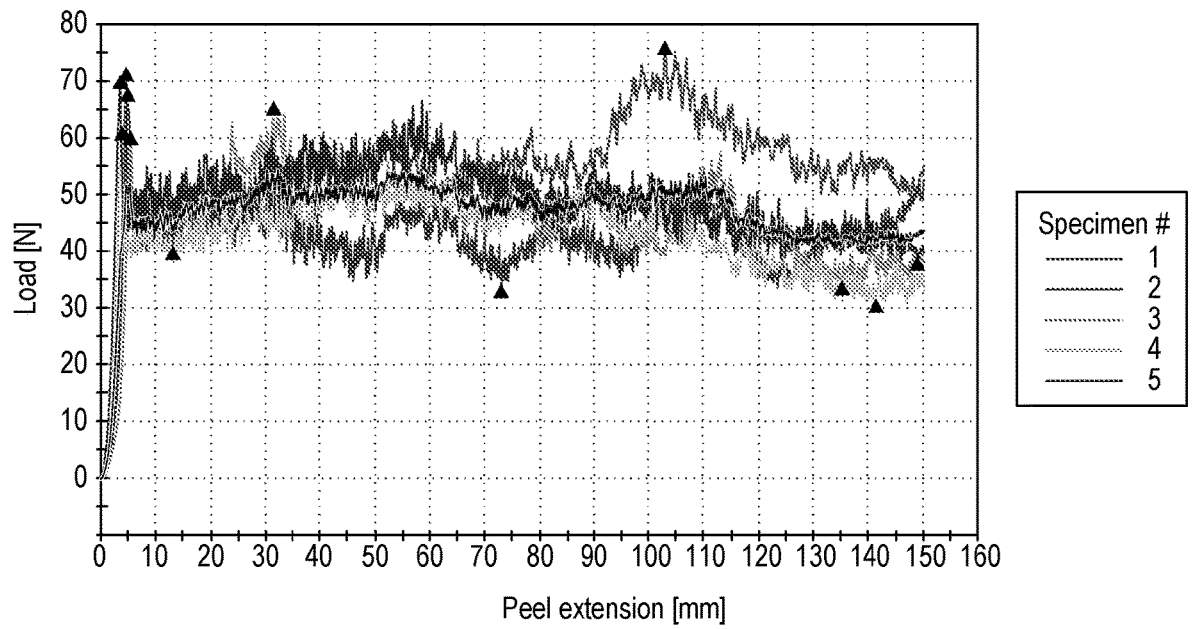
FIG. 13 shows the peel strength of a polymeric layer formed from polymeric precursor comprising compounds of formula I of FIG. 5 and from polymeric precursor thiol PETMP disposed between a styrene butadiene rubber layer and a nylon layer in a styrene butadiene rubber-nylon composite wherein the ratio of diallylamide groups:thiol groups was 1.0:2.4.

The method of Example 3a to 3c was repeated. The textile was contacted with a composition including the polymeric precursor of formula I of Example 3a and with a composition including thiol PETMP. The ratio of diallylamide groups:thiol groups was 1.0:2.4. Specimens 25 mm wide were cut from the resultant laminate, and the strength of the polymeric layer was tested using the T-peel test. The results are provided in FIG. 13 and the table 3d below:

TABLE 3d

|   | First Peak Load [N] | Min Peel Load [N] | Max Peel Load [N] | Average Load [N] | Average Load/Width [N/m] |
|---|---|---|---|---|---|
| 1 | 71.26 | 39.77 | 75.85 | 54.91 | 2196.20 |
| 2 | 67.63 | 33.08 | 67.63 | 43.76 | 1750.40 |
| 3 | 60.04 | 33.59 | 65.26 | 46.99 | 1879.58 |
| 4 | 60.85 | 30.52 | 60.85 | 43.39 | 1735.64 |
| 5 | 69.88 | 37.87 | 69.88 | 49.57 | 1982.63 |
| Mean | 65.93 | 34.97 | 67.90 | 47.72 | 1908.89 |
| Standard deviation | 5.18 | 3.77 | 5.56 | 4.74 | 189.72 |

The average load per unit width of the polymeric layer was 1,909 N/m (standard deviation 189.72 N/m).

EXAMPLE 3e

Figure 14:
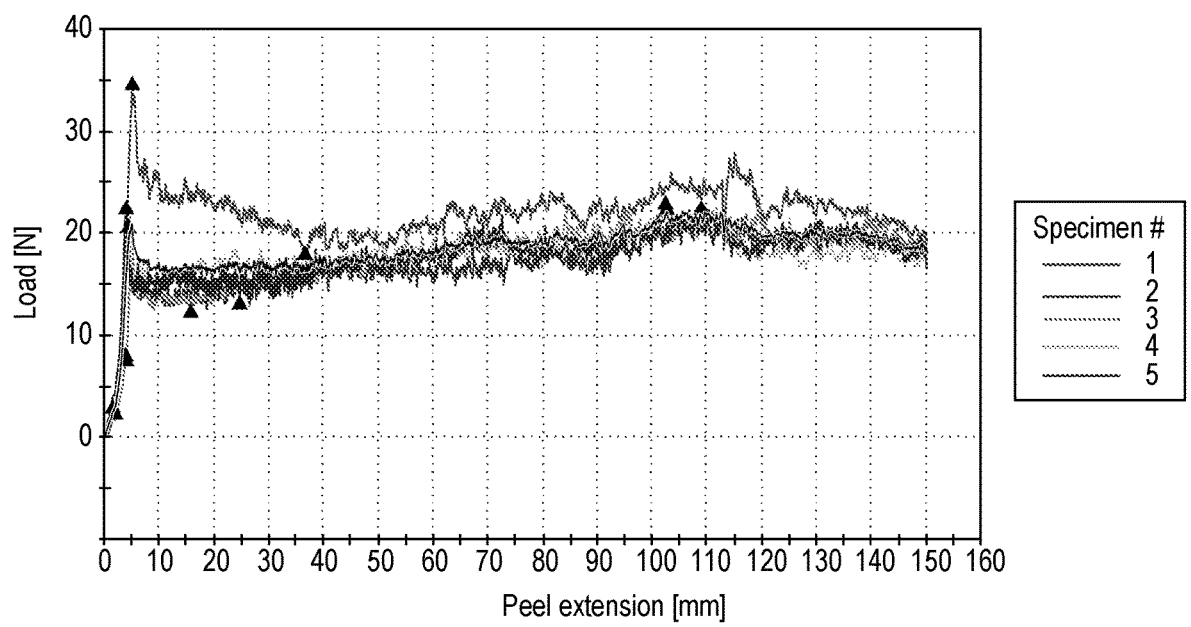
FIG. 14 shows the peel strength of a polymeric layer formed from polymeric precursor comprising compounds of formula I of FIG. 5 and from polymeric precursor thiol PETMP disposed between a styrene butadiene rubber layer and a nylon layer in a styrene butadiene rubber-nylon composite wherein the ratio of diallylamide:thiol groups was 1.0:1.6.

The method of Example 3a to 3d was repeated. The textile was contacted with a composition including the polymeric precursor of formula I of Example 3a and with a composition including thiol PETMP. The ratio of diallylamide:thiol groups was 1.0:1.6. Specimens 25 mm wide were cut from the resultant laminate, and the strength of the polymeric layer was tested using the T-peel test. The results are provided in FIG. 14 and the table 3e below:

TABLE 3e

|   | First Peak Load [N] | Min Peel Load [N] | Max Peel Load [N] | Average Load [N] | Average Load/Width [N/m] |
|---|---|---|---|---|---|
| 1 | 34.74 | 18.13 | 34.74 | 22.24 | 889.55 |
| 2 | 20.78 | 12.49 | 22.60 | 17.48 | 699.04 |
| 3 | 8.23 | 7.77 | 22.56 | 18.16 | 726.49 |
| 4 | 3.17 | 2.60 | 23.07 | 17.87 | 714.80 |
| 5 | 22.58 | 13.30 | 22.58 | 17.98 | 719.18 |
| Mean | 17.90 | 10.86 | 25.11 | 18.75 | 749.81 |
| Standard deviation | 12.49 | 5.90 | 5.39 | 1.97 | 78.76 |

The average load per unit width of the polymeric layer was 750 N/m (standard deviation 78.76 N/m).

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following Claims.

The invention claimed is:

1. A method of forming a polymer coated sulphur cured rubber composition including:
   providing a substrate,
   disposing a compound including at least one thiol group between a sulphur curable rubber composition and the substrate,
   disposing a second polymeric precursor between the sulphur curable rubber composition and the substrate,
   contacting the sulphur curable rubber composition with the compound including at least one thiol group,
   contacting the sulphur curable composition with the second polymeric precursor, wherein the second polymeric precursor includes a compound of formula A or II:

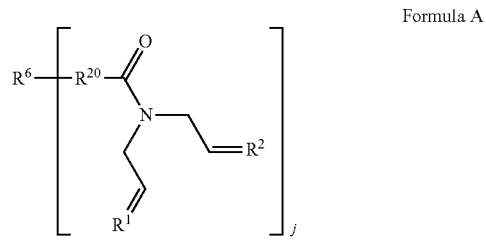

Formula A

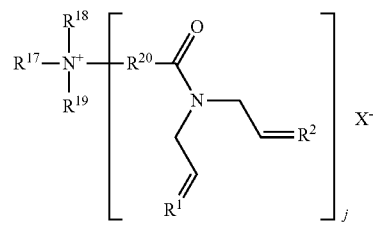

Formula I wherein each of $R^{17}$ to $R^{19}$ independently represents an optionally substituted hydrocarbyl group, or hydrogen;
$R^{20}$ represents an optionally substituted hydrocarbyl group;
each of $R^1$ and $R^2$ independently represents an optionally substituted hydrocarbyl group,
j is an integer from 1 to 4,
wherein if j represents 2, one of $R^{17}$, $R^{18}$ and $R^{19}$ is absent,
wherein if j represents 3, two of $R^{17}$, $R^{18}$ and $R^{19}$ are absent,
wherein if j represents 4, all of $R^{17}$, $R^{18}$ and $R^{19}$ are absent; and
$X^-$ represents a counter ion.

8. The method as claimed in claim 1 wherein the sulphur curable composition includes 0.5 to 10 wt. % sulphur.

9. The method as claimed in claim 1 wherein the composition comprising the compound including at least one thiol group includes less than 0.1 wt. % isocyanate.

10. The method of claim 1, wherein the substrate is contacted with the second polymeric precursor and the coated substrate is then contacted with the compound including at least one thiol group prior to the coated substrate being disposed proximate to the sulphur curable rubber composition.

11. The method of claim 10 wherein the compound including at least one thiol group and the second polymeric precursor are cured on the substrate prior to the coated substrate being disposed proximate to the sulphur curable rubber composition.

12. The method of claim 1, wherein the substrate is contacted with the compound including at least one thiol group and the coated substrate is then contacted with the second polymeric precursor prior to the coated substrate being disposed proximate to the sulphur curable rubber composition.

13. A composite including a substrate, a sulphur cured rubber and a polymeric layer disposed therebetween, wherein the polymeric layer is formed through the reaction of a compound including at least one thiol group, and a second polymeric precursor including a compound of Formula A or II,
wherein the compound having the structure of Formula A is

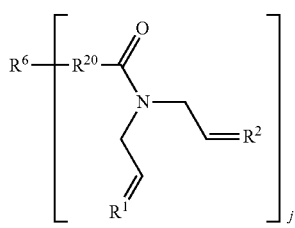

Formula A wherein $R^6$ represents an amine moiety, a quaternary ammonium cation or an optionally substituted hydrocarbyl group,
$R^{20}$ represents an optionally substituted hydrocarbyl group,
each of $R^1$ and $R^2$ independently represents an optionally substituted hydrocarbyl group,
j is an integer from 1 to 4;

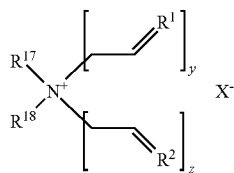

Formula II wherein each of $R^1$ and $R^2$ independently represents an optionally substituted hydrocarbyl group,
$R^{17}$ and $R^{18}$ independently represents an optionally substituted hydrocarbyl group, or hydrogen,
y is an integer of from 1 to 3;
z is an integer of from 1 to 3;
wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent; and
$X^-$ represents a counter ion;
reacting the compound including at least one thiol group and the second polymeric precursor to form a polymeric layer, wherein if the second polymeric precursor includes the component of formula A, then the ratio of diallylamide groups of the second polymeric precursor to thiol groups which react to form the polymeric layer is 1:1.5 to 25; and
curing the sulphur curable rubber composition to form the polymer coated sulphur cured rubber composition.

2. The method as claimed in claim 1 wherein the compound including at least one thiol group comprises an optionally substituted hydrocarbyl group and one to eight thiol groups.

3. The method as claimed in claim 2 wherein the hydrocarbyl group of the compound including at least one thiol group is substituted with one or more ether, ketone, ester, silane, amide and/or amine groups.

4. The method as claimed in claim 3 wherein the hydrocarbyl group of the compound including at least one thiol group is substituted with one or more ester, ether and/or amide groups.

5. The method as claimed in claim 1 wherein the compound including at least one thiol group does not include any functional groups except for thiol which react under the conditions used to react the compound including at least one thiol group and the second polymeric precursor to form a polymeric layer.

6. The method as claimed in claim 1 wherein the ratio of diallylamide groups of the second polymeric precursor to thiol groups which react to form the polymeric layer is 1:5 to 20.

7. The method as claimed in claim 1 wherein the second polymeric precursor includes a compound of formula I wherein $R^6$ represents an amine moiety, a quaternary ammonium cation or an optionally substituted hydrocarbyl group,
$R^{20}$ represents an optionally substituted hydrocarbyl group,
each of $R^1$ and $R^2$ independently represents an optionally substituted hydrocarbyl group,
j is an integer from 1 to 4; and
wherein the compound having the structure of Formula II is

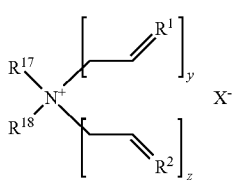

Formula II wherein each of $R^1$ and $R^2$ independently represents an optionally substituted hydrocarbyl group,
$R^{17}$ and $R^{18}$ independently represents an optionally substituted hydrocarbyl group, or hydrogen,
y is an integer of from 1 to 3;
z is an integer of from 1 to 3;
wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent;
$X^-$ represents a counter ion,
wherein if the second polymeric precursor includes the compound of formula A, then the ratio of diallylamide groups of the second polymeric precursor to thiol groups which react to form the polymeric layer is 1:1.5 to 25.

14. The composite of claim 13 wherein the polymeric layer is bonded to the sulphur cured rubber through covalent bonds.

15. The composite as claimed in claim 13 including more than one layer of sulphur cured rubber, and/or more than one layer of substrate, wherein each layer of the composite is bonded to adjacent layer(s) with the polymeric layer formed through the reaction of the compound including at least one thiol group and the second polymeric precursor.

16. An emulsion including an oil phase comprising a compound including at least one thiol group and an aqueous phase comprising a second polymeric precursor including a compound of Formula A or II,
wherein the compound having the structure of Formula A is

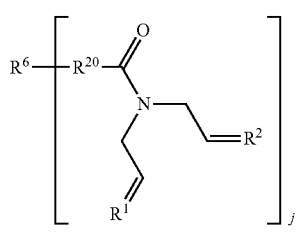

Formula A wherein $R^6$ represents an amine moiety, a quaternary ammonium cation or an optionally substituted hydrocarbyl group,
$R^{20}$ represents an optionally substituted hydrocarbyl group,
each of $R^1$ and $R^2$ independently represents an optionally substituted hydrocarbyl group,
j is an integer from 1 to 4; and
wherein the compound having the structure of Formula II is

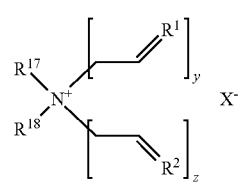

Formula II wherein each of $R^1$ and $R^2$ independently represents an optionally substituted hydrocarbyl group,
$R^{17}$ and $R^{18}$ independently represents an optionally substituted hydrocarbyl group, or hydrogen,
y is an integer of from 1 to 3;
z is an integer of from 1 to 3;
wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent; and
$X^-$ represents a counter ion;
wherein if the second polymeric precursor includes the compound of formula A, then the ratio of diallylamide groups of the second polymeric precursor to thiol groups which react to form the polymeric layer is 1:1.5 to 25.

17. An aqueous composition comprising a compound including at least one thiol group and a second polymeric precursor including a compound of Formula A or II,
wherein the compound having the structure of Formula A is Formula A wherein $R^6$ represents an amine moiety, a quaternary ammonium cation or an optionally substituted hydrocarbyl group,
$R^{20}$ represents an optionally substituted hydrocarbyl group,
each of $R^1$ and $R^2$ independently represents an optionally substituted hydrocarbyl group,
j is an integer from 1 to 4; and
wherein the compound having the structure of Formula II is

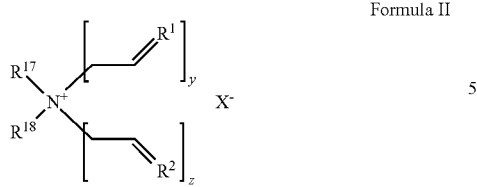

Formula II wherein each of $R^1$ and $R^2$ independently represents an optionally substituted hydrocarbyl group, $R^{17}$ and $R^{18}$ independently represents an optionally substituted hydrocarbyl group, or hydrogen, y is an integer of from 1 to 3;

z is an integer of from 1 to 3;

wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent; and $X^-$ represents a counter ion, wherein if the second polymeric precursor includes the compound of formula A, then the ratio of diallylamide groups of the second polymeric precursor to thiol groups which react to form the polymeric layer is 1:1.5 to 25.

* * * * *